United States Patent [19]

Kagawa

[11] Patent Number: 5,029,081
[45] Date of Patent: Jul. 2, 1991

[54] COMPUTER ANALYSIS SYSTEM FOR ACCESSING COMPUTATIONS ON AN INDIVIDUAL BASIS, PARTICULARLY FOR BIOENERGY ANALYSIS

[76] Inventor: Satoru Kagawa, Room 907, Ichigaya Hoso Building, 4-1-5, Kudan-kita, Chiyoda-ku, Tokyo 102, Japan

[21] Appl. No.: 430,084

[22] Filed: Oct. 6, 1989

Related U.S. Application Data

[63] Continuation-in-part of Ser. No. 233,611, Jul. 28, 1988, abandoned.

[30] Foreign Application Priority Data

Dec. 11, 1986 [JP] Japan .................................. 61-293351

[51] Int. Cl.⁵ ........................ G06F 15/02; G06F 15/20
[52] U.S. Cl. ........................... 364/413.01; 364/709.01; 364/710.01; 364/419
[58] Field of Search ............... 364/413.01, 419, 710.01, 364/710.02; 273/161

[56] References Cited

U.S. PATENT DOCUMENTS 4,101,962 7/1978 Hakata ........................... 364/413.01
4,184,202 1/1980 McCrae ........................... 364/413.01

FOREIGN PATENT DOCUMENTS 0159753 12/1981 Japan .
0185561 11/1982 Japan .
0024362 2/1984 Japan .
0060523 4/1984 Japan .

OTHER PUBLICATIONS

Quillman, M. et al., "Personal Numerology Report Printing Version", Electronic Astrologer Series, Astrolabe, Orelans, Mass., 1983.
"Numberscope Ver. 1.0", Zephyr Services, Pittsburgh, Pa., Mar. 1987.
"Alphanumerology Report", Matrix Software Inc., date unknown.

Primary Examiner—Clark A. Jablon
Attorney, Agent, or Firm—Dickstein, Shapiro & Morin

[57] ABSTRACT

A bioenergy control system in which bioenergy numbers are calculated based on the date-of-birth information inputted by an input keyboard. The information such as personality information corresponding to the bioenergy numbers is retrieved from a first memory to be delivered to a first output device and then the bioenergy numbers plus their associated information is stored in a second memory upon request. In response to key information, desired information in the second memory is retrieved and outputted by a second output device.

5 Claims, 22 Drawing Sheets

000
COMPUTER ANALYSIS SYSTEM FOR ACCESSING COMPUTATIONS ON AN INDIVIDUAL BASIS, PARTICULARLY FOR BIALNERGY ANALYSIS

This application is a continuation-in-part of Ser. No. 233,611, filed July 28, 1988 now abandoned.

TECHNICAL FIELD

The present invention relates to a bioenergy control system for calculating a bioenergy number based on the information concerning the date (day, month and year) of birth.

BACKGROUND ART

In general, there has been not an available instrument or device for personality assessment so that personality assessment has been left to the subjective judgement by a psychoanalyst based on the psychological theories.

However, a concept of bioenergy has been recently introduced. Bio-energy is a concept that balance of health condition and personality of a particular person are determined depending upon the numerical values which are determined depending upon the day, the month and the year of his/her birth.

A numerical value determined depending upon the date of birth is called a bioenergy number which is obtained by the bioenergy formulas to be described below and in response to the bioenergy numbers thus obtained, the information concerning personality and balance of health condition is classified. There exists 36 combinations of bioenergy numbers and the combinations of numerical values are classified into 36 types to determine personality and health balance.

However, so far, the calculations for obtaining the bioenergy numbers and the determination of personality and health balance in response to the bioenergy numbers thus obtained have been manually made, so that there has been the problem that the calculations and determination are extremely cumbersome and take a long period of time.

In addition, there is the problem that there has not been available any systems for storing the bioenergy numbers of individual persons and effectively using them as need demands.

DISCLOSURE OF THE INVENTION

In view of the above, it is an object of the present invention to provide a bioenergy control system which is capable of solving the above-described problems and calculating the bioenergy numbers in a simple manner to obtain information concerning personality and health balance.

It is another object of the present invention to provide a bioenergy control system which is capable of storing the bioenergy numbers of individual persons and effectively using them as need demands.

In order to achieve the object, in the first aspect of the present invention, a bioenergy control system comprises:

input means for inputting information about date of birth;

calculation means for calculating bioenergy numbers based on the inputted information about the date of birth;

memory means storing in advance values which can be assigned to the bioenergy numbers and information associated with the values;

retrieval means for retrieving from the memory means the information corresponding to the bioenergy numbers calculated by the calculation means; and output means for outputting the retrieved information.

According to the first aspect of the present invention, the information corresponding to values which can be assigned to the bioenergy number are previously stored in a memory means; the bioenergy numbers are calculated by calculation means based on the information concerning the date of birth of a particular person inputted by input means; and the information corresponding to the bioenergy numbers thus obtained is retrieved by retrieval means from memory means and outputted by output means so that the calculation of bioenergy numbers can be facilitated and the information corresponding to the bioenergy numbers can be obtained within a short period of time.

In the second aspect of the present invention, a bioenergy control system comprises:

calculation means for calculating bioenergy numbers based on the inputted information about the date of birth;

first memory means for storing in advance values which can be assigned to the bioenergy numbers and information associated with the values;

retrieval means for retrieving from the first memory means the information corresponding to the bioenergy numbers calculated by the calculation means;

first output means for outputting the retrieved information;

second memory means for storing registered information;

registration instruction means for instructing a registration of the bioenergy numbers calculated by the calculation means and being capable of inputting more than one piece of additional information associated with the bioenergy numbers calculated by the calculation means when the registration of the bioenergy numbers is instructed;

writing means for writing as the registered information into the second memory means the bioenergy numbers calculated by the calculation means and more than one piece of additional information inputted by the registration instruction means when the registration of the bioenergy numbers is instructed by the registration instruction means;

retrieval instruction means for instructing a retrieval of the registered information and inputting a key information to be retrieved;

retrieving means for reading out from the second memory means registered information corresponding to the information inputted by the retrieval instruction means in response to the instruction from the retrieval instruction means; and second output means for outputting the readout registered information.

According to the second aspect of the present invention, in addition to the first aspect described above, additional information is added to the bioenergy numbers obtained by calculation means and then stored in a second memory means so that the information concerning desired bioenergy numbers can be retrieved by retrieval means and the bioenergy numbers can be effectively used in response to the purposes.

BEST MODE FOR CARRYING OUT THE INVENTION

DESCRIPTION OF THE LAW OF BIOENERGY

Overview

Figure 1:
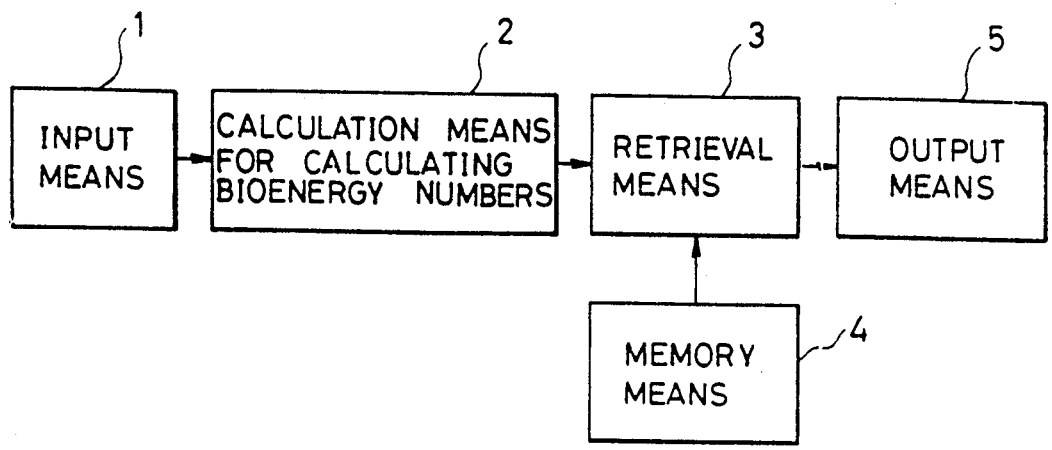
FIG. 1 is a block diagram showing a first embodiment of the present invention.

All living bodies are formed from atoms or particles. All of the substances existing on the earth are formed from an indefinite number of atoms or particles and these particles are discharged or formed due to the explosion of stars in the cosmic space. Each of these particles carries energy and the particles form substances through association with one another by the action of an electric force thereof.

Particles with high energy are always impinging on the earth's surface, the form of which is created after the lapse of many years, as cosmic rays and living bodies are created in a certain environment (such as the earth) in which certain conditions are satisfied.

The particles which create living bodies are light energy from the sun. In the vast and infinite cosmic space, a variety of cosmic rays cross with each other and particles with high energy are impinging on the earth as cosmic rays.

Particles having an electromagnetic energy such as visible light, ultraviolet rays, X-rays and gamma-rays reach the earth as light (inclusive or invisible ones) from the sun and these rays create living things. The particles constituting the living things are different light energies and the term "bioenergy" means the living body per se.

The law of bioenergy is demonstrated by cosmophysics. The living bodies created under certain conditions evolve into man with the passage of 4.5 billion years. However, since the living things per se comprise associated particles, they must obey a certain physical law. The particles from the sun are white in color (in fact, invisible and colorless). This is because a specific antiparticle is necessarily present corresponding to each of the particles and they are white-colored as a whole. The visible light can be recognized as the subject of rainbow colors. This is because the particles of light affect other substances to generate a variety of rays. In particular, the primary three colors, i.e., blue, green and red, form all of the other colors. Therefore, the mixing of these primary three colors with each other results in the formation of white color (colorless) and if each of the primary three colors is mixed with the corresponding complementary color, more specifically, if a particle is associated with its corresponding antiparticle, white color (colorless) is formed. It is believed that the energy of light )=living things=bioenergy) creates different energies through the mixing of three basis energies and the corresponding three antienergies. Thus, the "law of bioenergy" is a certain law of living things which is found out on the basis of the foregoing ideas and is defined thereby.

The law of bioenergy is not to analyze the actual character capacities and inclinations effective in an individual at the present time, but is to analyze the basic or inherent energies which are given to a man at the time when he is born.

A variety of bioenergies are given to a man at the time of his birth and basically there are differences between men in the energies depending on the combination of such bioenergies. If one can know about, for instance, the kinds of energies which are given to him and the kinds of energies which can be displayed by him in the past, at present and in the future, he can recognize his present conditions with high accuracy and he can make use of such knowledge as a clue to find out his correct future course. In the "law of bioenergy," the difference between superficial characters and capacities and inclinations of a specific individual, which are easily influenced by the environments encountered in the past and at the present, are not analyzed, but the kinds of energies which he would have are analyzed. To determine which kinds of energies are strong and what kinds of energies are weak in an individual makes it possible to perform self-analysis and to make the relationship with other persons more clear. This is quite useful in deciding one's future course.

DETAILED DISCUSSION

It is said that all of the atoms or particles which constitute a human body are formed by the energy emitted from stars during their explosion in the cosmic space. The light particles transmit a variety of energies to the earth. The light particles include a great deal of energy which can create living things on stars and planets which satisfy certain conditions to thus create a variety of organisms. Human beings, which are the highest evolved living things on the earth, can also grow, think and behave only when we absorb and accumulate a variety of energies created by the light particles. The force which controls all of the behaviors of human beings is the very "bioenergy" and the "law of bioenergy" is a clear definition of the manner in which each energy affects various substances.

The light particles which are pouring on the earth are white colored. However, among the rays emitted from the sun, visible rays are the rainbow colors ranging from blue to red colors. The rays emitted from the sun include, in addition to the visible rays, ultraviolet rays, X-rays and gamma rays. This is because the light particles affect the other substances and thus are converted to a variety of rays. In this respect, the primary three colors, i.e., blue, green and red, create all of the other colors.

It is believed that an antiparticle corresponding to each of the whole particles which form substances is necessarily present. They are controlled through a balance therebetween. The same also applied to the light particles.

Regarding the three primary visible colors, there is a complementary color corresponding to each of the three basic colors, which are as follows: Blue→Yellow; Green→Light Purple; Red→Bluish Green. The complete mixing of a color and the corresponding complementary color forms white color and the maximum energy is thus generated.

As has been explained above, there are three primary colors in light, and the light is divided into the following three regions depending on their wave length (electromagnetic wave):

Blue region: (400 to 500 millimicrons)
Green region: (500 to 600 millimicrons)
Red region: (600 to 700 millimicrons)

In the region ranging from blue having a short wave length to red having a long wave length, each light particle transmits an energy to substances. The light particles, in order, ranging from blue light having a short wave length to red light having a long wave length, likewise give energies to human bodies to allow creation of "bioenergies" therein. (In fact, the particles are transmitted to the human bodies at the velocity of light and, therefore, there is no difference in transmission time.)

The "law of bioenergy" is a numerical representation of the magnitude of the influences of light energy on the tissues of the living things. It is based on the three primary colors of light plus three corresponding complementary colors as described below.

It these six colors are replaced by numerical values 1 to 6, i.e., Blue—6, Green—5, Red—4, Yellow—1, Light Purple—2 and Bluish Green—3, the numerical values represented by "bioenergy" are calculated by a "bioenergy calculator" on the basis of the date of birth of a specific person. For example, the bioenergy of a man who was born on March 31, Showa 61 (1986) can be expressed by three bioenergy numerals, among six numerals 1 to 6, i.e., 6-2-2.

The bioenergy numeral of a specific individual is essentially specified at the time when he was born and is never changed throughout his life.

The following are the 36 bioenergy numerals:

| 112 | 213 | 314 | 415 | 516 | 611 |
| --- | --- | --- | --- | --- | --- |
| 123 | 224 | 325 | 426 | 521 | 622 |
| 134 | 235 | 336 | 431 | 532 | 633 |
| 145 | 246 | 341 | 442 | 543 | 644 |
| 156 | 251 | 352 | 453 | 554 | 655 |
| 161 | 262 | 363 | 464 | 565 | 666 |

A bioenergy control system (hereafter referred to as "BECS") is a system for analyzing the character and ability of a specific individual and is a system for performing self-control, in which a numerical representation of six kinds of energies inherently possessed by all human beings are included in an original software. To effectively use the BECS, first of all the content of the following items must be understood.

As noted above, all of the substances existing on the earth are formed from an indefinite number of atoms or particles associated with each other. The particles are transmitted to the earth as light particles and human beings are also created from these light particles. Human beings are the highest evolved living things and acquire the ability of growing, thinking and behaving through absorbing and accumulating the various energies given by the light particles. The term "bioenergy" means the force which controls all of the behaviors of a specific individual and is given by the light particles.

Bioenergy can roughly be divided into six kinds of energies, i.e., 1. energy for concentration—NENRYOKU; 2. energy for exchanging=JYORYOKU; 3. energy for controlling =KANRYOKU; 4. accumulating energy=JIRYOKU; 5. circulating energy=RIRYOKU; 6. diverging energy=DORYOKU. These six kinds of energies are combined in accordance with a predetermined rule (discussed in detail below) and are realized as the "bioenergy" of each individual. The combination is determined at the time when each individual is born and is never changed throughout his life. Therefore, there are differences in energies between individuals and further there are differences in character, thought patterns and behaviors between individuals who would have the same energies. In other words, some display the bioenergy sufficiently while another displays it only insufficiently depending on his environment, parental relationships sibling relationships or the like of a specific individual.

Moreover, bioenergy can be roughly divided into superficial and latent energies. In infancy, only the latent energy is working and, therefore, the infant has his own way. However, at around puberty, not only the latent energy but also the superficial energy are working. The individual becomes conscious of his own value and he can take an objective view of various things. Therefore, there is correspondingly a great difference between the individual who can display only the latent energy and the individual who can sufficiently display the superficial energy as well even if they have the same energy. It becomes an important point in making use of the BECS to recognize the kinds of energies which one inherently possesses or which are lacking, the reason why such energies are displayed, and so forth. The BECS is designed to provide a way to activate the superficial energy. Therefore, it is not applied to infants in which only the latent energy is working.

The following explains the six kinds of bioenergies.

1. Energy for concentration=NENRYOKU (ability to look far ahead into the future)

This energy is an ability to take appropriate and effective steps toward desired objectives. This imparts the ability to overcome difficulty to an individual even if there are many obstacles to goals he has determined.

2. Energy for exchanging=JYORYOKU (ability to give love to others)

This energy is an ability to bring up delicacy and love or affection. Due to this energy, an individual can take care of personal relationships, can understand another's way of thinking and behavior and can express his own feelings and way of thinking without any difficulty.

3. Energy for control=KANRYOKU (ability to cope with changes)

This energy is an ability to adapt to the movement of the world. Due to this energy, one can multilaterally deal with everything and can receive and adapt to changes in matters and information precisely.

4. Accumulating energy=JIRYOKU (ability to keep one's habitual life)

This energy is an ability to maintain one's present environment. Due to this energy, one can accumulate his bodily powers and intellectual power and, as a result, he can display an ability of managing and servicing himself to create optimum conditions for himself.

5. Circulating energy=RIRYOKU (ability to inquire deeply into things)

This energy is an ability to theoretically judge and analyze things. Due to this energy, one can consider things according to a certain law, without departing therefrom and, therefore, he can obtain well-balanced and non-arbitrary ability of application and judgment.

6. Diverging energy=DORYOKU (ability to judge things)

This energy is a force which makes it possible to make more rapid progress than now. Due to this energy, one can take immediate action on the basis of quick judgment and can take effective steps toward his future.

Detailed Discussion of Characteristics of Bioenergy's Base Numbers

Each of the above combinations can be analyzed from various angles, to discover, for instance, a person's latent abilities (latent energy), the superficial energies currently being displayed by that person, or any energies which the person is lacking.

Example:
112→Superficial energies
666→Latent energies

The 36 three-digit combinations are as follows.

Characteristics of Bioenergy's Base Numbers

The following amplifies the above discussion of the six types of bioenergies.

1. Focusing energy=Willpower (the ability to read the future)

This energy provides the ability to advance undeterred toward a fixed goal. It generates the power to overcome any number of obstacles in reaching a clearly defined goal.

2. Exchanging energy=Emotional power (the ability to convey love)

This energy provides the ability to nurture compassion with and love for other people. A person with this energy attaches great importance to relationships with other people, and not only is able to understand other people's thinking and actions, but also can readily convey his or her own emotions and thoughts.

3. Controlling energy=Sensitivity (the ability to respond to change)

This energy provides the ability to nurture a sensitivity to the course of events in the world. A person with this energy can respond flexibly in varied situations, and can use his or her own standards or judgement to perceive change quickly.

4. Accumulating energy—Perserverance (the ability to create lifestyle patterns)

This energy provides the ability to maintain the current environment. A person with this energy is able to accumulate physical and mental resources throughout his or her life, and also has the ability to preserve and organize such resources in order to create an optimum situation for him- or herself.

5. Circulating energy=Rational power (the ability to pursue things deeply)

This energy provides the ability to judge and analyze things rationally. A person with this energy is able to follow a single set of rules and keep his or her thoughts in a consistent pattern; this leads to an ability to judge and respond to things with balance and not only according to personal whim.

6. Scattering energy=Motivation (the ability to make decisions)

This energy provides the ability to strive further that the present level. A person with this energy is able to act in diverse ways on the strength of instantaneous decisions, and can cultivate the ability for future progress.

Basic Character Traits Corresponding to the 36 Bioenergy Number Combinations From 112 (Latent Energy 666) to 666 (Latent Energy 112)

112/666—Someone who jumps on any bandwagon that offers a rosy future.

123/655—Someone who longs for perfection and aspires strongly to personal perfection.

134/644—Someone who always wants to be first with the news about social trends or fashions.

145/633—Someone who readily accepts the opinions of experts and likes to repeat those opinions to other as their own.

156/622—Someone who likes to learn skills and abilities different from others', sparing no effort in learning them.

161/611—Someone who is a romantic, longing to escape from the troublesome affairs of the world to a place of innocence and security.

213/565—Someone who likes to take a firm leadership role in groups of people brought together by a common theme or cause.

224/554—Someone who likes traditional ceremonies and festivities, and take social conventions seriously, desiring strongly to preserve them.

235/543—Someone who enjoys making merry at gatherings of family or friends, favoring a fashionable ambience at such gatherings.

246/532—Someone with a strong drive to spontaneously do things for other people without thinking of personal gain or loss.

251/521—Someone who likes to observe and analyze coolly the actions of a wide group of acquaintances, at all times.

262/516—Someone who is personally motivated to act as a leader in helping mutual friends and acquaintances.

314/464—Someone who reads social trends far into the future, so as to build assets energetically and confidently.

325/453—Someone with an exceptional linking for a gamble, but not involving others, even though not caring about personal risk.

336/442—Someone with a sensitivity to fashions who eagerly embraces new things before anyone else, and who can act on personal motivation.

341/431—Someone who enjoys a daily routine of physical exercise and workouts.

352/426—Someone who derives great pleasure from exploiting their own extensive knowledge to find the solution to various problems.

363/415—Someone who likes to travel domestically and abroad, doing so without hesitation, but disliking organized group tours.

415/363—Someone with an eye to the future who enthusiasticaly and from an early stage participates in activities that promise a solid dividend.

426/352—Someone who enjoys spending holidays with family and friends by savoring the break from routine at a small party or similar event.

431/341—Someone who dislikes cut-throat competition with others, preferring to pursue the best personal result possible under prevailing conditions.

442/336—Someone whose peace of mind comes from always having immediate access to shopping, and who has a keen eye for functional, rather than monetary value.

453/325—Someone whose greatest joy in like is to pick and choose by trial and error in creating their personal living environment.

464/314—Someone with a lively interest in society who will step out without hesitation, but never seeks adventure.

516/262—Someone who delights in telling people the latest news, so stays up on what's happening as a matter of course.

521/251—Someone who displays intense interest in and detailed knowledge of topical affairs, even when not personally involved.

532/246—Someone interested in off-beat matters who delights in recounting their own off-beat experiences.

543/235—Someone more interested in the trappings used in doing something than in the deed itself who conscientiously adds to a wide knowledge of such trappings.

554/224—Someone who always values personal observation as the basis on which to evaluate issues and so reacts to first-hand news with alacrity.

565/213—Someone who decides personally on the best means of doing something, is interested in achieving goals that are of practical use, and enjoys the process of investigating even things that cannot be executed in practice.

611/161—Someone who is extremely interested in singlehandedly organizing affairs, even ideas that as yet have no tangible form.

622/156—Someone interested in the benefits of acquaintance and experience with a wide range of people who will venture to unknown places without hesitation in search of such experiences.

633/145—Someone interested in situations which would put an ordinary person on edge, and who only satisfies this urge through personal experience.

644/134—Someone who will always find time to participate in events that offer some personal advantage, even if the event is not career-related.

655/123—Someone who is single-minded about what he or she likes, sparing no cost in pursuing an interest to the exclusion of all else.

666/112—Someone who likes what's new, so will always willingly follow up news to check it out personally.

The fields of application of the BEC system are as follows: analysis of individual character; discovery and development of individual capacity; maintenance and improvement of health; improvement in learning ability; improvement and harmony of personal relations; recognition of one's aptitude and capacity in an enterprise; formation of a team in a department and each company; and acquisition of customers and improvement in the results of business.

It is important to start from personal application and then to extend the fields of application.

After sufficiently understanding the methods for analyzing the character and capacity of oneself and members of one's family and controlling methods for improving them, the next step can be taken to extend the fields of application. The BEC system operates as follows. First, input data to use the BECS is manually input in order according to instructions displayed on an image plane or display screen. These displayed instructions are as follows. First, the date of birth of an individual (and other data) are input. Then, the bioenergy number of the individual is displayed on the image plane. Successive steps are taken by pushing the "next image plane" key, in turn. Finally, a method or technique to provide increased self-understanding, self-control or self-actualization of the individual is displayed on the image plane. Information relating to traits associated with the various bioenergy number combinations, as discussed above, is also displayed on the display screen.

According to the foregoing operations, a method for analyzing the character and capacity of an individual and a method for performing increased self-control, self-management or self-actualization are displayed in each step respectively. The contents (data) on the image plane are obtained on the basis of the bioenergy which a subject possesses by nature as determined by his birth date. All of the following matters are made clear by analyzing these data while comparing them with the present status of the individual: the kinds of latent capacity which are possessed by the individual; the kinds of capacities which he lacks; the way to perform self-improvement and so forth. The BEC system can be used not only to realize the character and capacity of an individual, but also to analyze energies which the individual possesses by nature and to perform self-control. The bioenergy control system according to the invention was developed for the purposes of correctly judging individual character and capacity and for improving them through self-control. It should be noted that if the system is used in a manner departing from the inherent purposes thereof as described above, such as an evil application for other persons, a counter-flow phenomenon of self energy is caused and this leads to the formation of negative factors for such user. When using the system, one should always be conscious of this point.

Referring now to the accompanying drawings, the embodiments of the present invention will be described in detail.

FIG. 1 shows an example of a fundamental arrangement of the first embodiment of the present invention.

In FIG. 1, reference numeral 1 denotes input means for inputting the information concerning data of date of birth; and 2, calculation means for calculation bioenergy numbers in response to the date of birth information inputted by input means 1.

Reference numeral 3 represents retrieval means for retrieving the information corresponding to the bioenergy numbers obtained, from memory means 4; and 5, output means for outputting the information retrieved by retrieval means 3.

Figure 2:
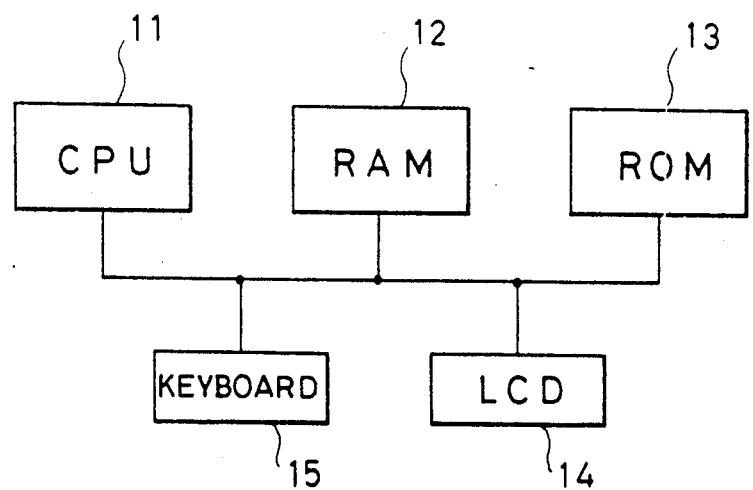
FIG. 2 is a block diagram illustrating a detailed arrangement thereof.

FIG. 2 shows an example of a detailed arrangement of the first embodiment of the present invention.

Figure 4:
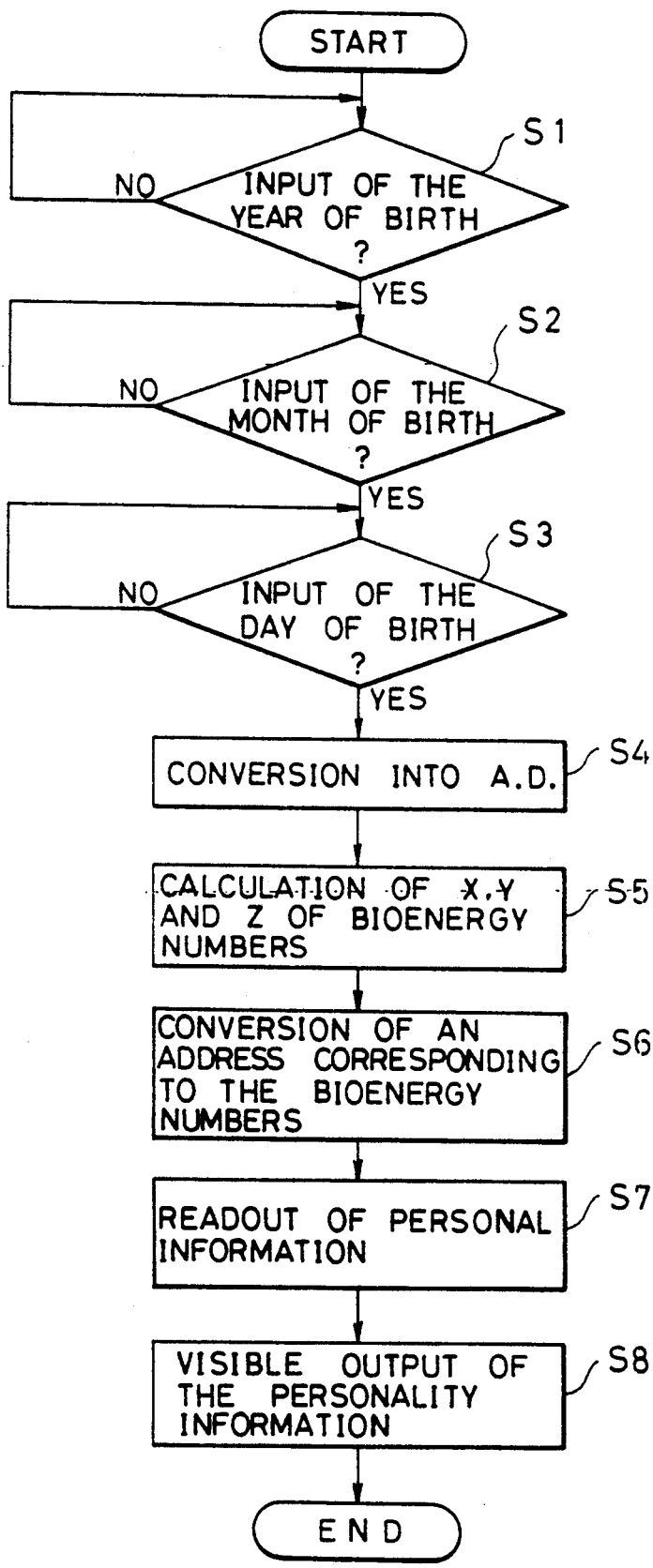
FIG. 4 is a flowchart illustrating the control procedure thereof.

In FIG. 2, reference numeral 11 designates a central processing unit (CPU) which is, for instance, the product, the type number HM900, of Hitachi Corp. and executes the control procedure shown in FIG. 4. It is to be understood that the CPU 11 is not limited to the above-mentioned product and may be another CPU manufactured by other makers.

Reference numeral 12 represents a random access memory (RAM) in which the variables used in the control procedure executed by the CPU 11 and the date of birth information inputted by a keyboard 15 are stored.

Reference numeral 13 designates a read only memory (ROM) in which the control procedure shown in FIG.

4 is stored previously. In the ROM 13, personality information associated with each of all values of bioenergy numbers is also stored. In the first embodiment, the above-mentioned information is stored in the ROM 13, but it is to be understood that this information may be stored on a recording medium such as a floppy disc or a memory card so that it can be read therefrom.

Reference numeral 14 represents a display device. While a liquid crystal display (LCD) is used in the first embodiment, other information output means such as a printer, a CRT display device or means for voice output from a tape recorder also may be used.

Figure 3:
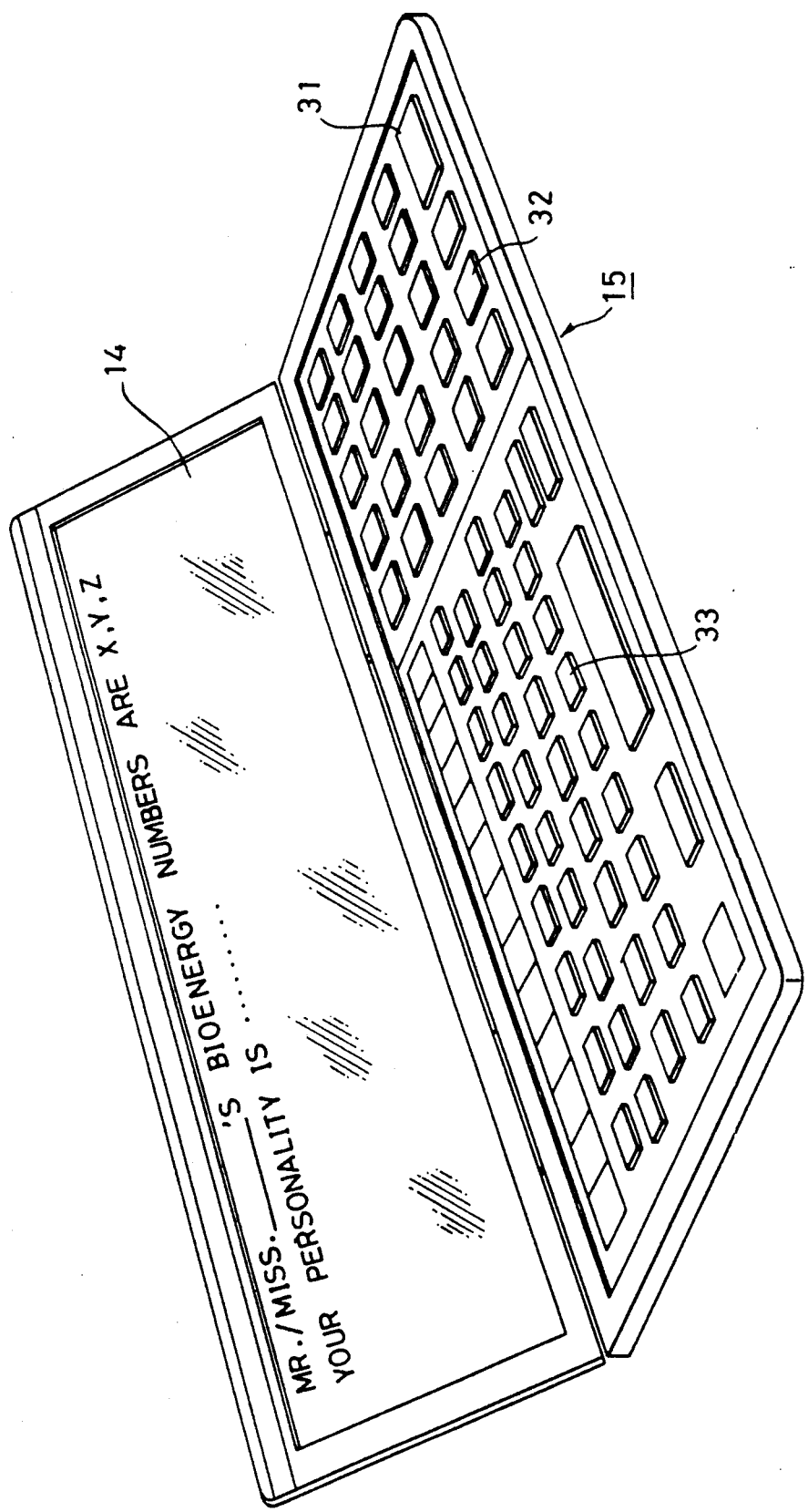
FIG. 3 is a perspective diagram illustrating an outer appearance thereof.

Reference numeral 15 denotes input means for which a keyboard is used in the first embodiment. As shown in FIG. 3, the keyboard 15 has character keys 33 for inputting character information and ten-keys 32 for inputting numerical information. The inputted information is transferred from the keyboard 15 to the CPU 11 by pushing an input command key 31.

Next, referring to FIGS. 3 and 4, the mode of operation of the first embodiment of the present invention will be described.

The control procedure shown in FIG. 4 is used as calculation means 2 and retrieval means 3.

When an operator inputs the date of birth information by pushing the ten-keys 32 and the input command key 31 on the keyboard 15, the CPU 11 stores the inputted information in the RAM 12 (Steps S1–S3). In this case, the inputted date of birth information is the information of the year corresponding to the Showa, Taisho or Meiji era.

Next, the inputted date-of-birth information is converted into the Christian era or A.D. (Step S4). The method for accomplishing such conversion is well known in the prior art, so no detailed description shall be made. But, for instance, when the year of birth is in the Showa era, it can be converted into the year in A.D. by adding "1925" to the year of birth in the Showa era.

Next in Step S5, the calculation of bioenergy numbers is executed. The bioenergy numbers are expressed in the form of three integers "X, Y, Z" and are obtained in accordance with the bioenergy calculation formula which will be described below.

The year in A.D. of birth is represented by a variable YEAR: the month of birth, by a variable MONTH: and the day of birth, by a variable DAY. Then, $$X = \text{the remainder of YEAR}/6 \text{ (When the remainder is ``0'', it is assumed to be six (6).)} \quad (1)$$

$$Y = \text{the remainder of D}/6 \text{ (When the remainder is ``0'', it is assumed to be six (6).)} \quad (2)$$

$$Z = \text{the remainder of } (X+Y)/6 \text{ (When the remainder is ``0'', it is assumed to be six (6).)} \quad (3)$$

The variables A, B, C and D are defined as follows:

$$D = A + C \quad (4)$$

$$C = \text{the remainder of B}/6 \text{ (When the remainder is ``0'', it is assumed to be six (6).)} \quad (5)$$

When the month (MONTH) of birth is April, June, August, October or December, $$A = MONTH/2 \quad (6)$$

and $$B = DAY + 30 \quad (7)$$

When the month (MONTH) of birth is February, $$A = MONTH/2 \quad (8)$$

and $$B = DAY + 31 \quad (9)$$

When the month of birth is January, September or November, $$A = \text{a raised integer of MONTH}/2 \quad (10)$$

$$B = DAY \quad (11)$$

When the month of birth is March, May or July, $$A = \text{a raised integer of MONTH}/2 \quad (12)$$

and $$B = DAY - 1 \quad (13)$$

(when B is "0", it is assumed to be "61" and new A becomes a value obtained by substructing "1" from A obtained by Eq. (12). When the new A is "1" and YEAR is not a leap year, then B is assumed to be "60".)

As described above, based upon the birth-of-data information YEAR, MONTH and DAY, the bioenergy numbers X, Y and Z are obtained from Eqs. (1)–(13). The explanation of a detailed program for this purpose shall not be made and it suffices to prepare a program by using a high class language such as BASIC, COBOL, FORTRAN, etc.

The bioenergy numbers X, Y and Z thus obtained define 36 combinations ranging from "112", "123", "145", . . . to "666". Therefore, the personality information corresponding to the bioenergy numbers X, Y and Z obtained in Step S5 is read out from the ROM 13 (Steps S6–S7).

Various method for retrieving the personality information may be considered. For instance, 36 kinds of records each consisting of one set of bioenergy numbers and its corresponding personality information are previously stored in the ROM 13.

One record of the bioenergy numbers and its corresponding personality information are read out at a time from the ROM 13 sequentially and then it is judged whether the readout each bioenergy numbers coincide with the bioenergy numbers calculated in Step S5 or not. When they coincide with each other, the corresponding personality information is retrieved.

In the case of another example, 36 kinds of bioenergy numbers and information of memory addresses in the ROM 13, each of which stores the personality information corresponding to the bioenergy numbers are tabulated and stored in the ROM 13 and by the information of a memory address obtained from the calculated bioenergy numbers, the personality information stored therein is read out.

The retrieved personality information is visually displayed on the LCD 14 as shown in FIG. 3 (Step S8) and the control procedure terminates.

According to the first embodiment of the present invention, the personality information is stored in memory means and then the personality information corresponding to a set of bioenergy numbers is retrieved and displayed, but it is of course to be understood that in addition to the personality information, health balance information obtained in response to bioenergy numbers and other information obtained by using the above-mentioned information such as information concerning a suitable job and a suitable position in a company, information about a learning method, etc. obtained in accordance with the personality assessment of a particular person, can be stored.

Figure 5:
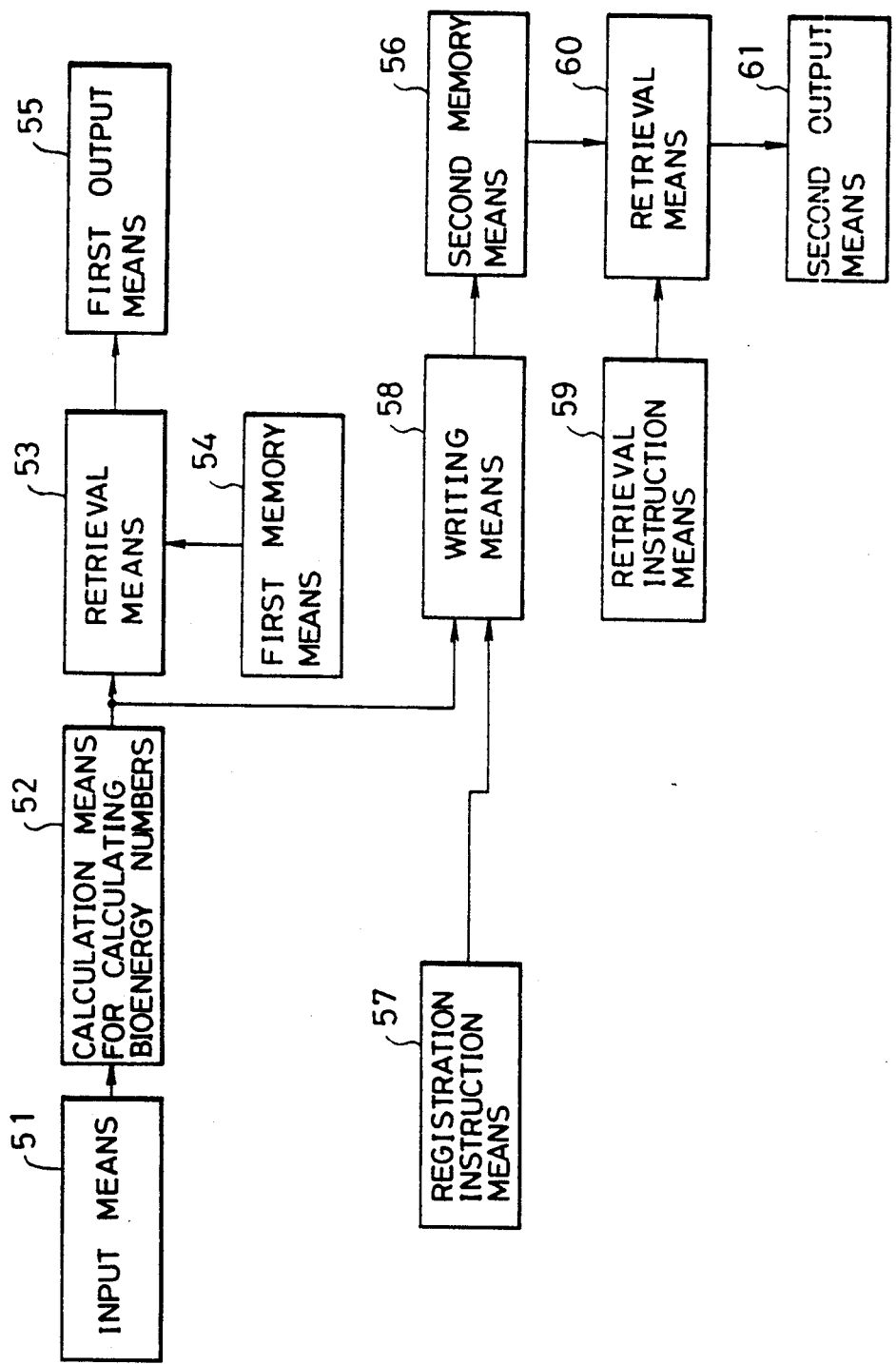
FIG. 5 is a block diagram showing a second embodiment of the present invention.

FIG. 5 shows one example of the fundamental arrangement of the second embodiment in accordance with the present invention.

In FIG. 5, reference numeral 51 represents input means for inputting date-of-birth information.

Reference numeral 52 denotes calculation means for obtaining bioenergy numbers in response to the inputted date-of-birth information.

Reference numeral 54 denotes first memory means for previously storing therein values which can be assigned to bioenergy numbers and their associated information.

Reference numeral 53 denotes retrieval means for retrieving the information corresponding to the bioenergy numbers calculated by calculation means 52 from the first storage means 54.

Reference numeral 55 denotes first output means for outputting the information read out by retrieval means 53.

Reference numeral 56 denotes second memory means for storing therein the registered information.

Reference numeral 57 denotes registration indicating means for indicating a registration of the bioenergy numbers calculated by calculation means 52 and being capable of inputting more than one piece of additional information associated to the bioenergy numbers calculated by calculation means 52 when the registration of the bioenergy numbers is instructed.

Reference numeral 58 denotes writing means for writing in the second memory means 56 the registered information, the bioenergy numbers calculated by calculation means 52 and more than one piece of additional information inputted by the registration indication means 57 to configure the registration information when the registration of the bioenergy numbers is instructed by the registration indication means 57.

Reference numeral 59 denotes retrieval indication means for instructing the retrieval of the registered information and inputting information which functions as a key in the information retrieval.

Reference numeral 60 denotes retrieval means for retrieving from the second memory means 56 the registered information reconfigured in accordance with the information inputted by the retrieval indication means 59 in response to the instruction therefrom.

Reference numeral 61 denotes second output means for outputting the registered information read out by retrieval means 60.

Figure 6:
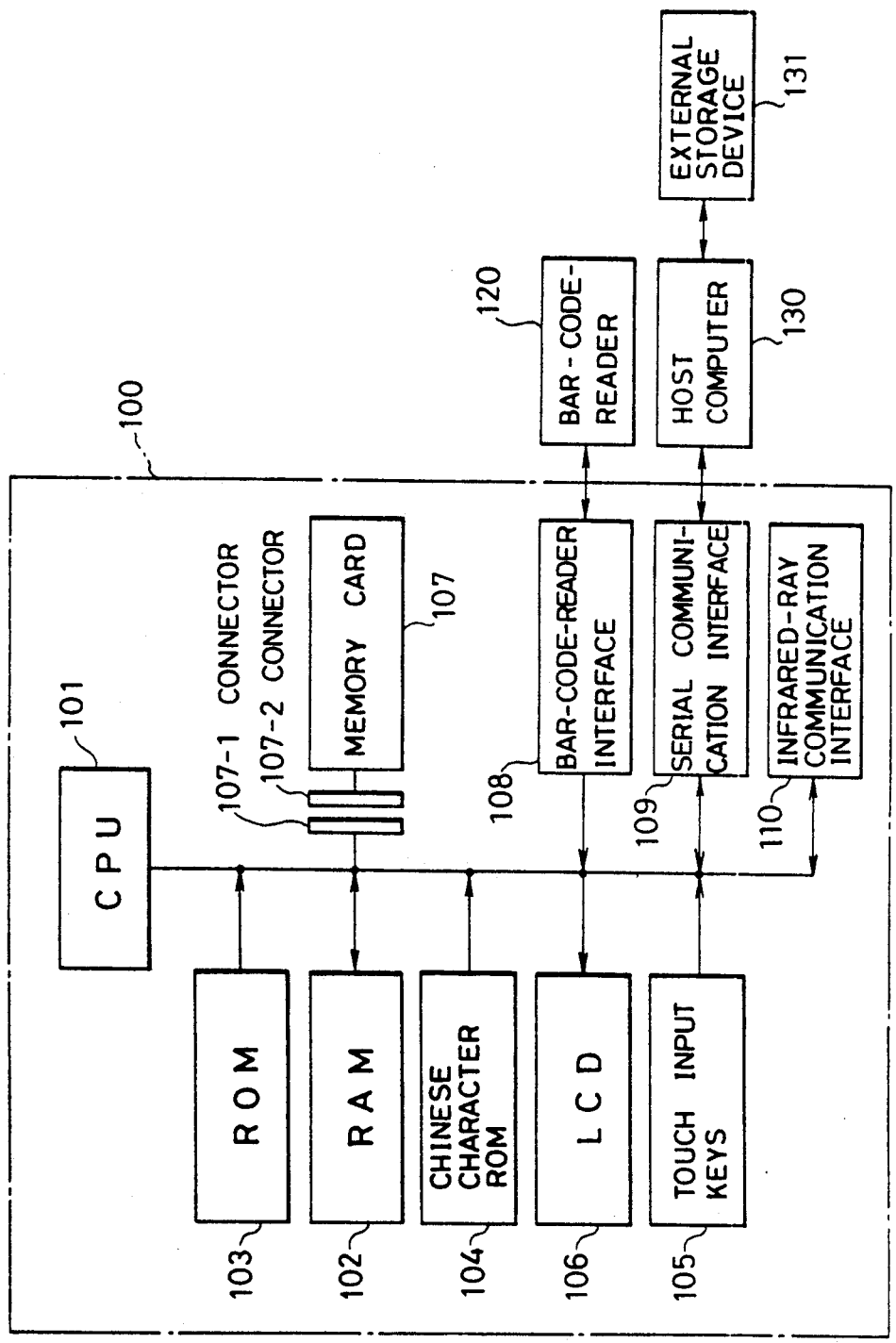
FIG. 6 is a block diagram illustrating the detailed arrangement thereof.

FIG. 6 shows a detailed arrangement of the second embodiment of the present invention.

Figure 22:
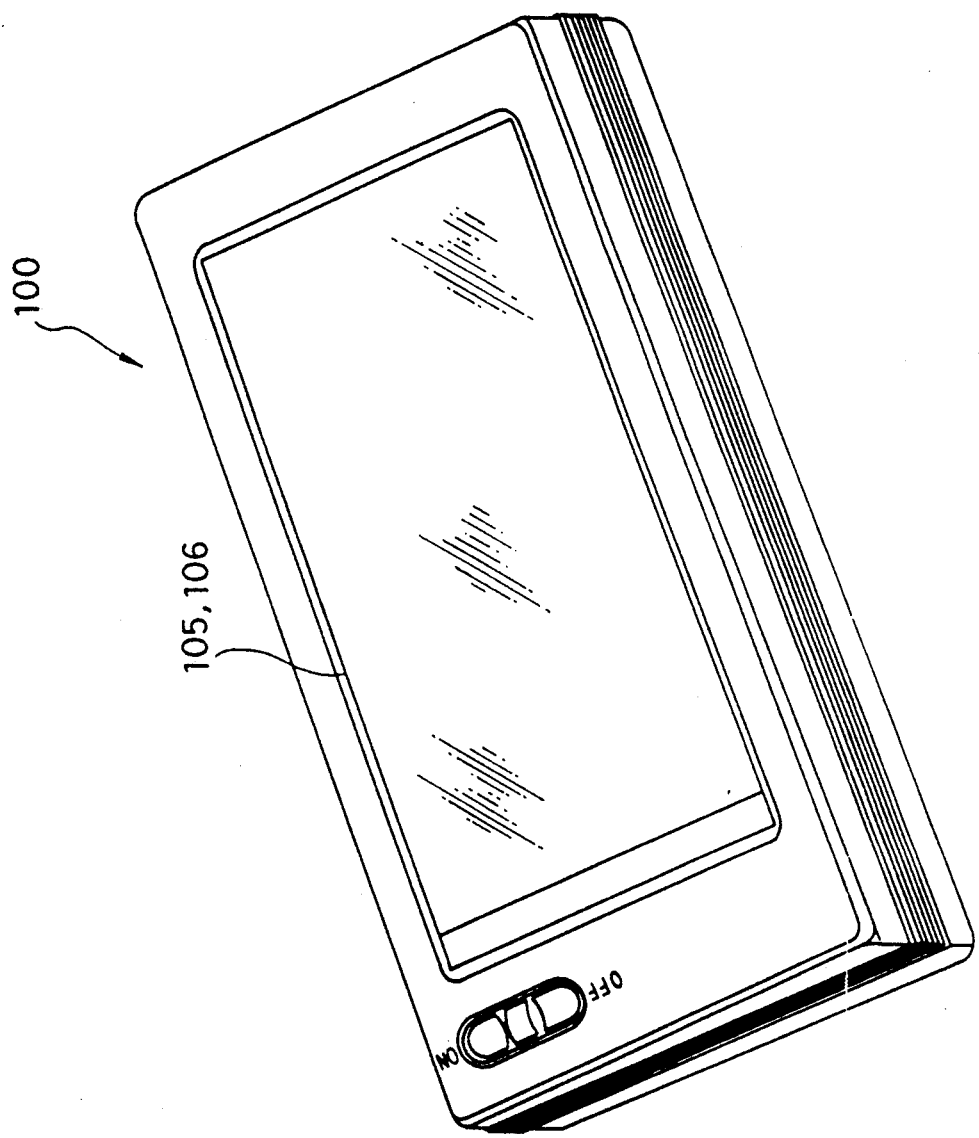
FIG. 22 is a perspective diagram of a bioenergy calculator 100 in accordance with the second embodiment of the present invention.

In FIG. 6, a block indicated by dot-and-dashed lines represents a bioenergy calculator having the outer appearance as shown in FIG. 22. 101 represents a CPU which executes control procedure as shown in FIGS. 7-15; and 102, RAM for storing therein variables used in the execution of the control procedure by CPU 101 and information inputted by a touch input key 105.

Reference numeral 104 denotes a Chinese character ROM in which Japanese syllable rows and Chinese characters corresponding to the Japanese syllable rows are stored in predetermined relationship therewith. The Chinese character the ROM 104 is used for converting into the Chinese characters a Japanese syllable row inputted by the touch input key 105, by the CPU 101.

Reference numeral 106 represents a liquid crystal display (LCD) for displaying the input and output information and used as first and second output means; and 105, a plurality of transparent touch input keys for inputting the information. These touch input keys 105 which function as input means are arranged on the display window of the LCD 106 and when an operator pushes a touch input key 105, the coordinates are transmitted from this touch input key to the CPU 101 which uses the same information as that displayed at the position defined on the above-mentioned coordinates on the LCD 106 as the input information.

Reference numeral 107 designates a memory card for storing therein the personality information corresponding to bioenergy numbers obtained by the CPU 101. The memory card has non-volatile memories called $E^2PROM$ and can be connected or detached by means of a connector 107-1 of the memory card 107 and a connector 107-1 on the side of a data bus.

It is preferable that the personality information, vocational aptitudes, character of a good partner for bride or groom and any other required information depending upon the bioenergy numbers are stored in a plurality of memory cards 107. In this case, the operator can select and use each of the memory cards 107 depending upon the desired purposes so that it is not needed to enlarge the capacity of a memory in the bioenergy computer 100.

The memory cards 107 may be used as an expanded memory for RAM 102.

Reference numeral 108 denotes a bar-code-reader interface for transferring information inputted by a bar-code-reader 120 into CPU 101. For instance, a sheet of paper bearing the bar-code information is placed over the outer surface of each memory card 107 so that the bar-code information is read out by the bar-code reader 120. The bar-code information includes a password, name, contents stored in the memory card, etc. of each card holder so that the number of input operations by pushing of the touch key 105 by the operator can be decreased.

Reference numeral 109 represents a serial-communication interface (I/0) interposed between the CPU 101 and a host computer 130 for establishing the intercommunication therebetween. Furthermore, the bioenergy computer 100 is provided with an interface 110 for permitting the communication by the infrared rays.

Reference numeral 130 denotes a host computer which functions as writing means in order to store the information transmitted from the bioenergy computer 100 into an external storage device 131. The host computer 130 has also the function of retrieval means for reading out the desired information from the information stored in the external storage device 131 which is a second memory means.

Reference numeral 131 designated an external storage device in which the information is stored on a recording medium such as a hard disc or a floppy disc.

In the second embodiment of the present invention with the above-described system arrangement, a plurality of bioenergy numbers and key-word information associated therewith such as the names, blood types, favorite colors, etc. of individual persons are stored in the external storage device. The information stored in the external storage device 131 is retrieved by the host computer 130 so that the names of a plurality of persons having the same bioenergy numbers, for instance, are displayed on LCD 106 of the bioenergy computer 100 and the bioenergy numbers are effectively used according to the desired purposes.

Figure 7:
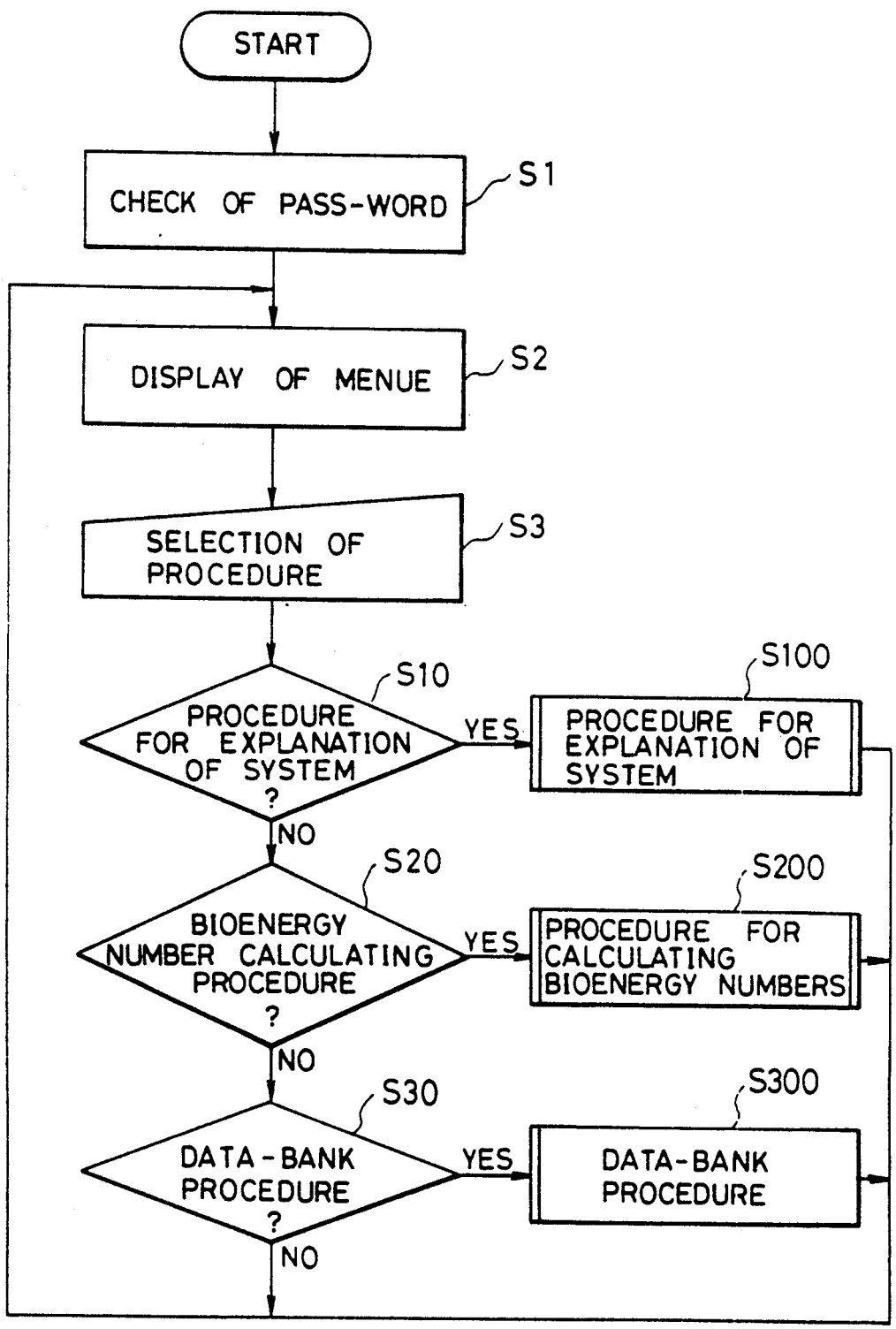
FIGS. 7-16 are flowcharts illustrating the control procedure thereof.

FIG. 7 shows the main control procedure executed by the CPU 101 in the second embodiment of the present invention.

Figure 17:
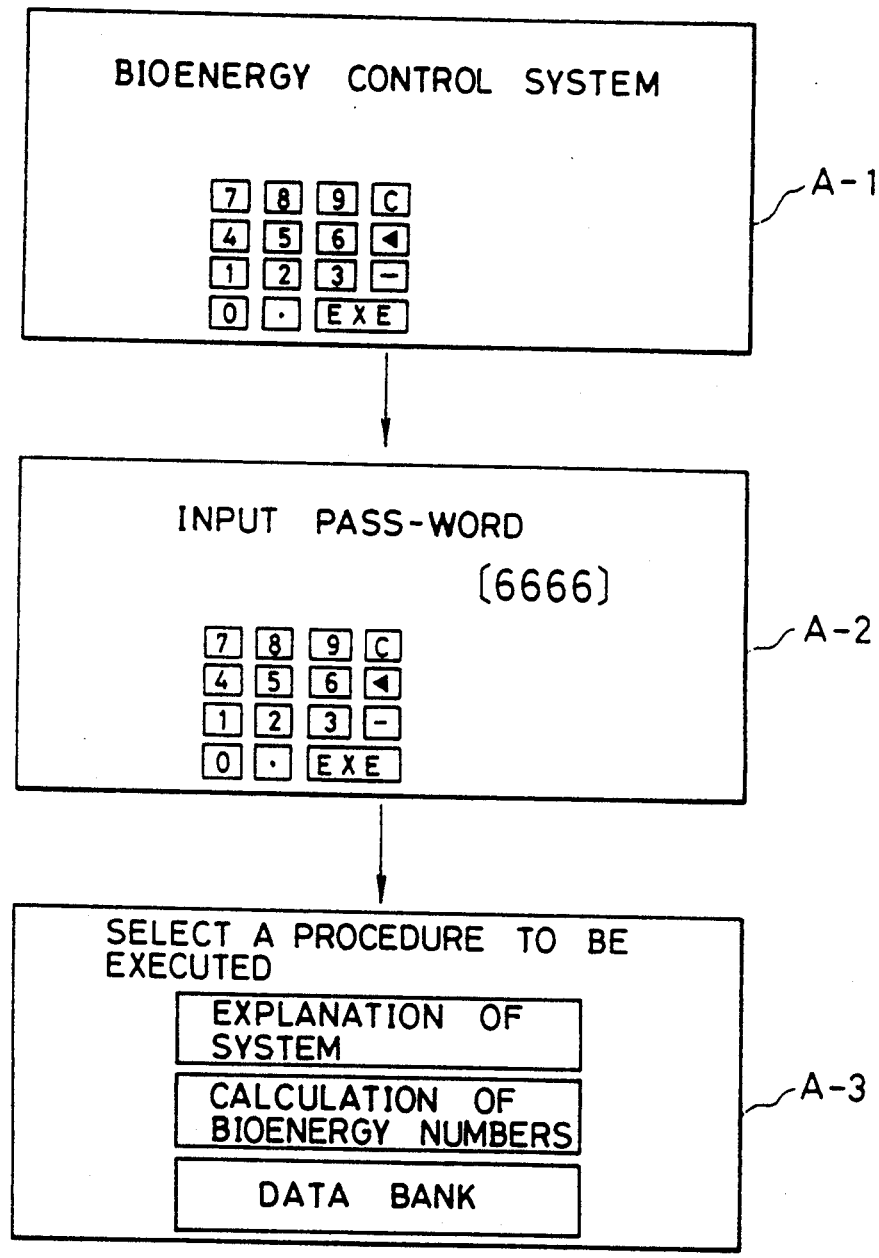
FIGS. 17, 18A, 18B, 19, 20 and 21 are explanatory diagrams used to explain displayed images of LCD 104 shown in FIG. 5.

Referring now to FIG. 7, the bioenergy computer 100 is first energized to wait for an input of a pass-word by the operator while the ten-keys as shown on display screen A-1 in FIG. 17 are displayed on the LCD 106 by CPU 101. The key "EXE" on the display screen A-1 is a key for instructing a transmission of the inputted information to CPU 101.

When the operator inputs a pass-word "6666" by the touch input keys 105 displayed on the display screen and then depresses the key "EXE", the CPU 101 judges whether the inputted pass-word matches or not with the registered pass-word previously assigned to each testee and when they match with each other, the operation of the system is permitted to proceed to the next procedure (Step S1). According to the second embodiment of the present invention, when the operation of the system is started, the check of the pass-word is made, but it is to be understood that the check of the pass-word is not made and is made only in the case of the registration and retrieval of bio energy numbers.

In Step S2, a menu for selecting a procedure to be executed by the CPU 101 is displayed on the LCD 106 as shown at A-3 in FIG. 17 and the system waits for an input of an instruction by the operator. In response to the input of the instruction, the CPU 101 selects the control procedure to be executed. In the case of the display as shown at A-3, when the operator depresses the position at which is displayed "the explanation of the system", the control procedure proceeds from Step S3→Step S10 to Step S100. When the position at which is displayed "the bioenergy computation" is depressed by the operator, the control procedure proceeds from Step S3→Step S10→Step S20→ to Step S200. When the position at which is displayed "the data-bank processing" is depressed by the operator, the control procedure proceeds from Step S3→Step S10→Step S20→Step S30→ to Step S300.

Figure 8:
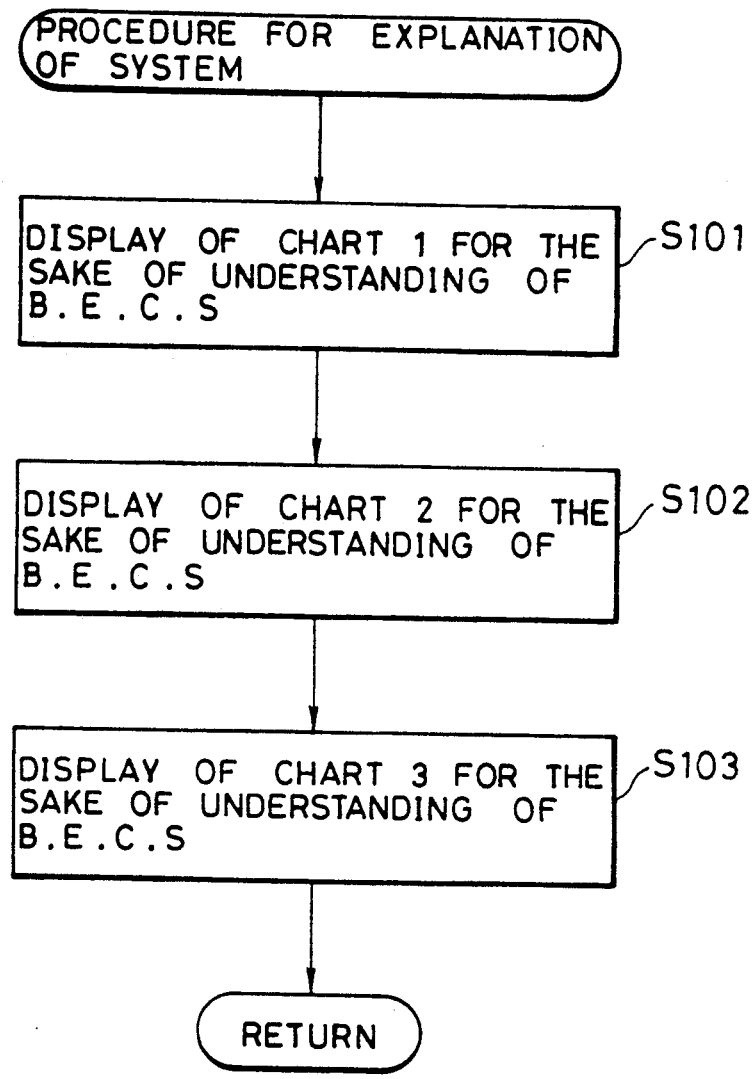

FIG. 8 shows a detailed control procedure for the explanation of the system in Step S100 shown in FIG. 7.

In FIG. 8, the CPU 101 reads out information about an explanation of the system such as a method how to use the system, an explanation of bioenergy numbers and a method for utilizing bioenergy numbers from the memory cards 107, and displays them sequentially to terminate the control procedure (Steps S101–S103).

Figure 9:
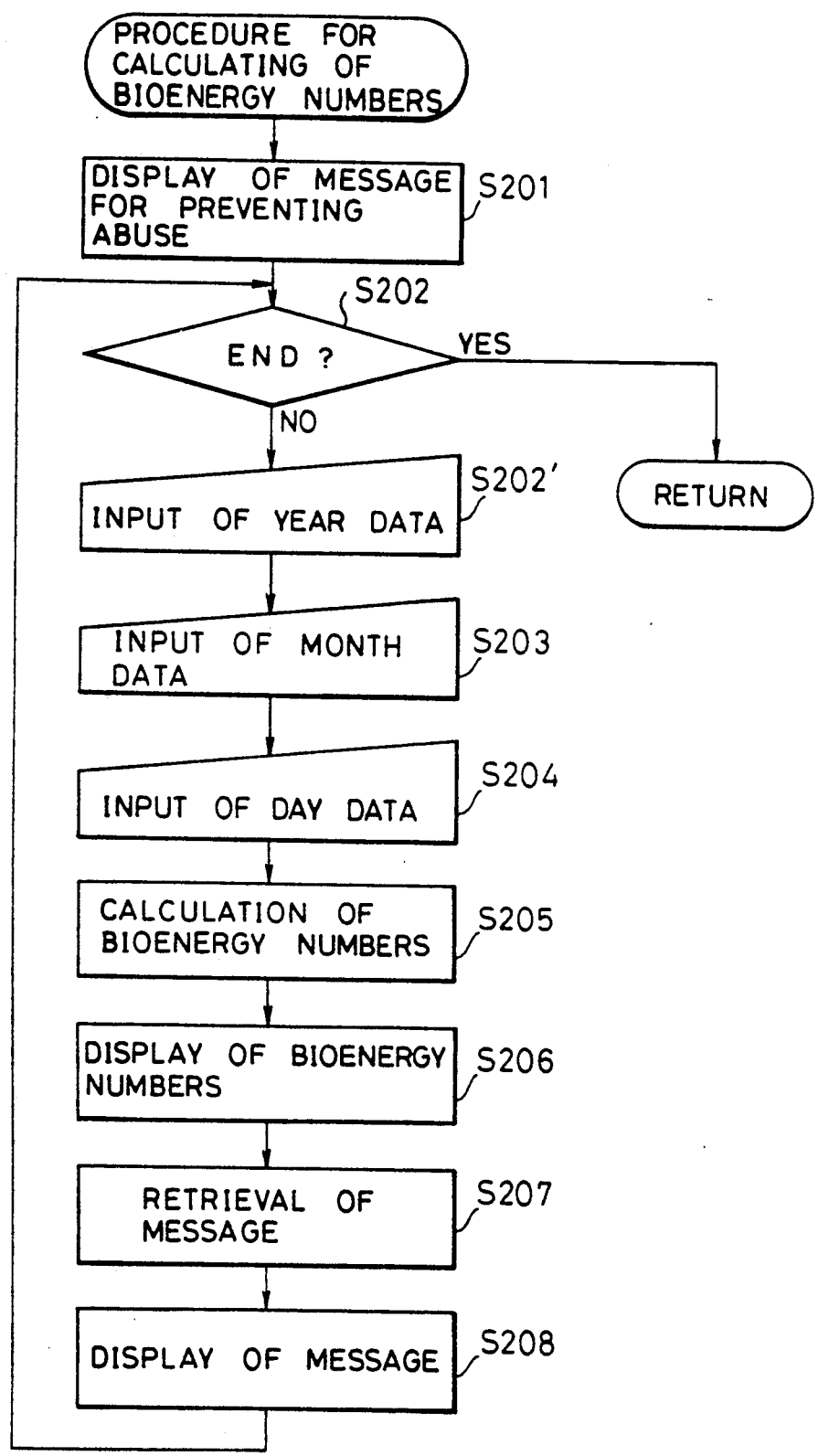

FIG. 9 shows a detailed control procedure for an arithmetic operation of bioenergy numbers carried out in Step S200 shown in FIG. 7. This control procedure accomplishes the functions of the calculation means and the retrieval means in the second embodiment of the present invention.

In FIG. 9, the CPU 101 reads out from the memory card 107 a message for preventing the abuse which in turn is displayed on the LCD 106 (Step S201). Furthermore, the CPU 101 causes the LCD 106 to display the "END" key which instructs whether the control procedure is terminated or not. After the confirmation of the continuation of the control procedure in response to the information inputted by the "END" key, the LCD 106 displays the ten-keys for inputting the date-of-birth information.

After the input by the operator of the date-of-birth information (Steps S202–S204), the CPU 101 calculates bioenergy numbers (Step S205). Since the formula for obtaining bioenergy numbers has been described in detail above, no further detailed explanation thereof shall not be made.

Next the CPU 101 causes the LCD 106 to display the calculated bioenergy numbers and then reads out the personality information corresponding to the bioenergy numbers from the memory card 107 and displays the personality information on the LCD 106 (Steps S205–S208).

After the above-mentioned procedure has been terminated, it returns to Step S202 and the CPU 101 confirms the termination of the control procedure. Thus the control procedure is terminated.

After the above-mentioned control procedure has been executed, the calculated energy numbers and the inputted date-of-birth information are stored in the RAM 102. Such stored information is used in the case of the registration to be described hereinafter.

Figure 10:
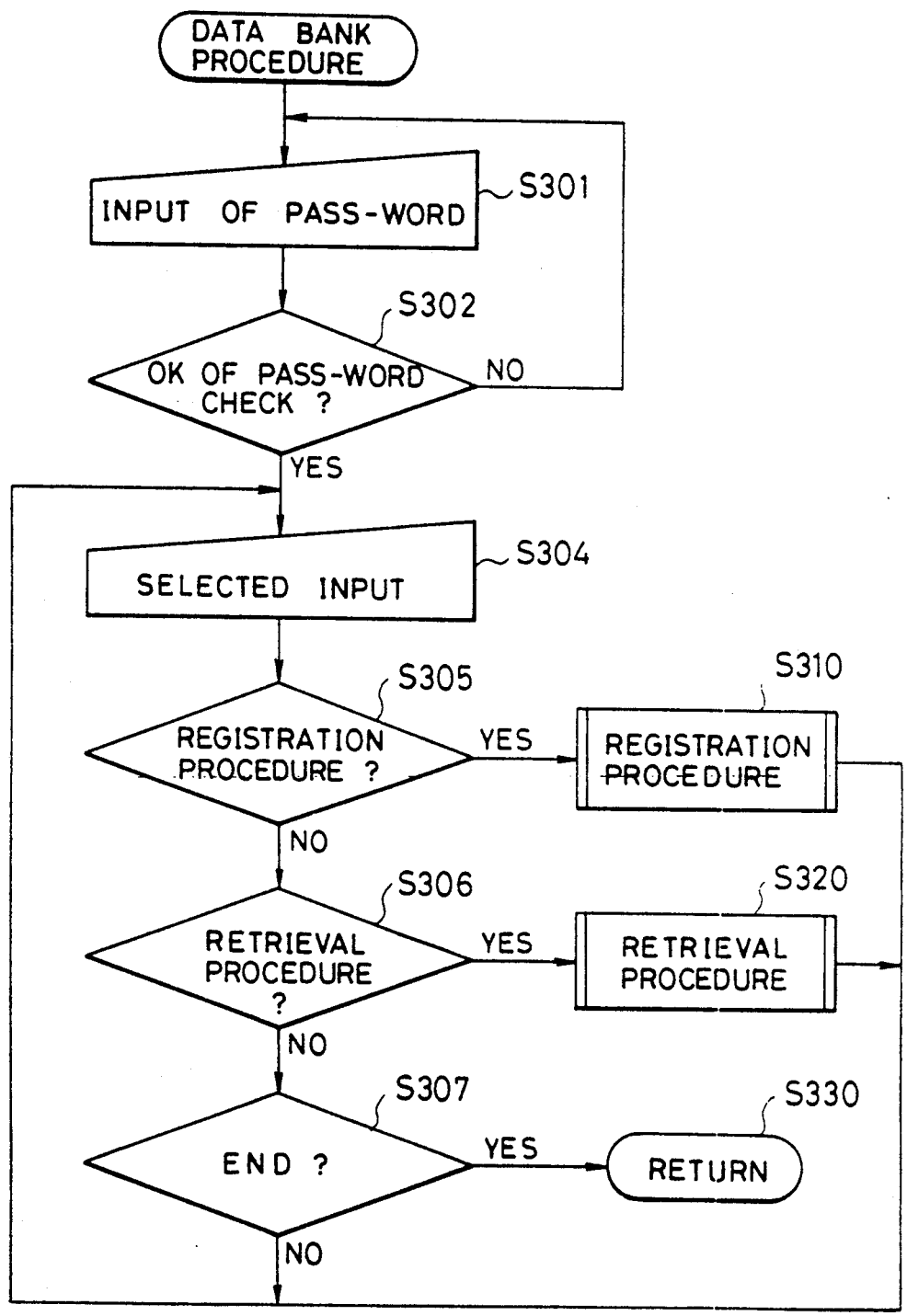

FIG. 10 shows a detailed control procedure for databank process carried out in Step S300 shown in FIG. 7.

In FIG. 10, the CPU 101 displays the ten-keys on the LCD 106 as shown at A-1 in FIG. 18 and then waits for a input of a pass-word by the operator (Step S301).

The input of the pass-word is made in order to prevent the abuse of information stored in the host computer 130. The CPU 101 compares the inputted pass-word with a previously registered pass-word and when they coincide with each other, the CPU 101 displays a display B-1 shown at A in FIG. 18 on the LCD 106.

The display B-1 is a display for selecting and inputting the procedure to be executed by the CPU 101. When the position at which is displayed "the registration" is depressed by the operator, the procedure proceeds through the Steps S304→S305→S310 in the order named.

Upon depression by the operator of the position at which is displayed "RETRIEVAL", the procedure proceeds through Steps S304→S305→S306→S307 in the order named and then terminates.

Figure 11:
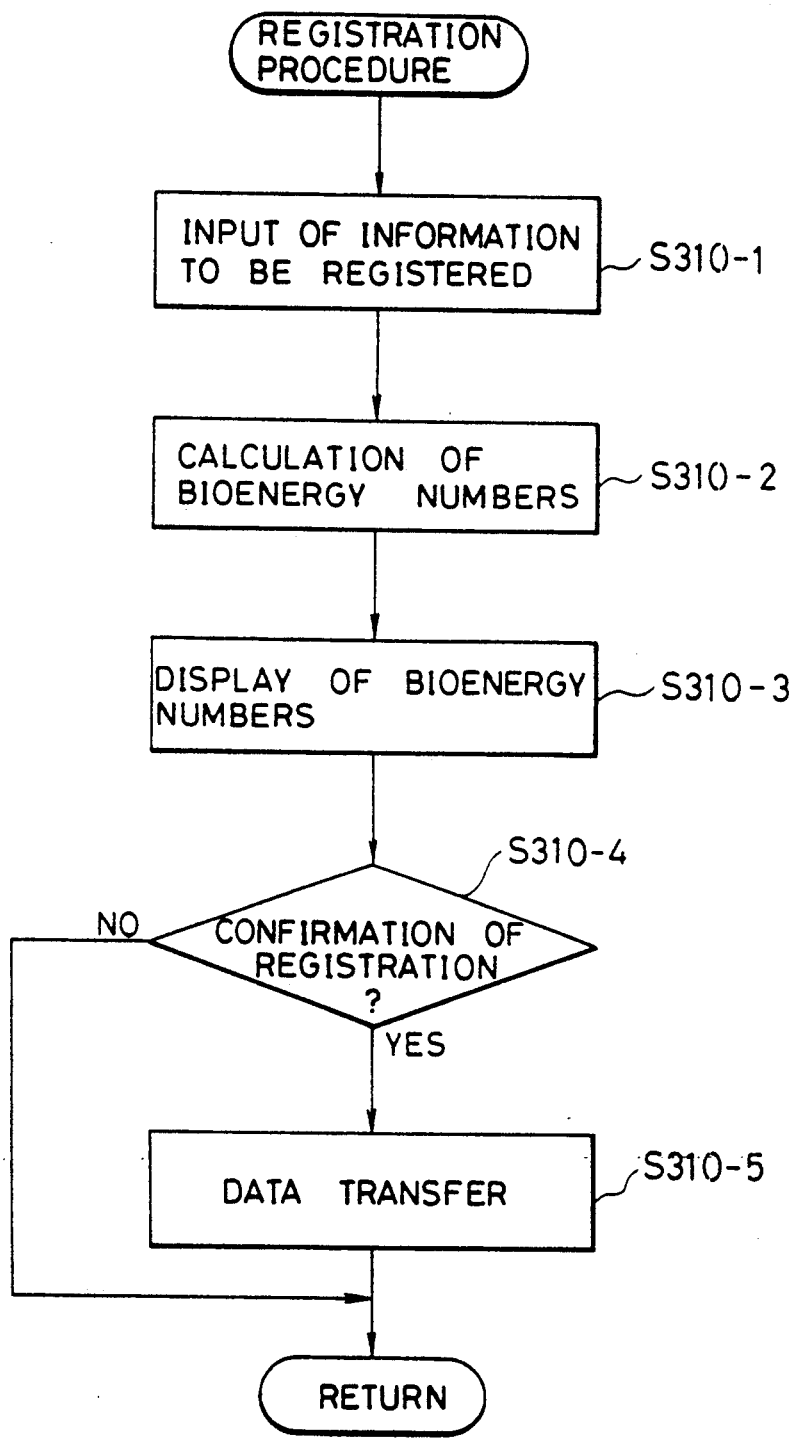

FIG. 11 shows a detailed procedure for registration carried out in Step S310 shown in FIG. 10.

Figure 18A:
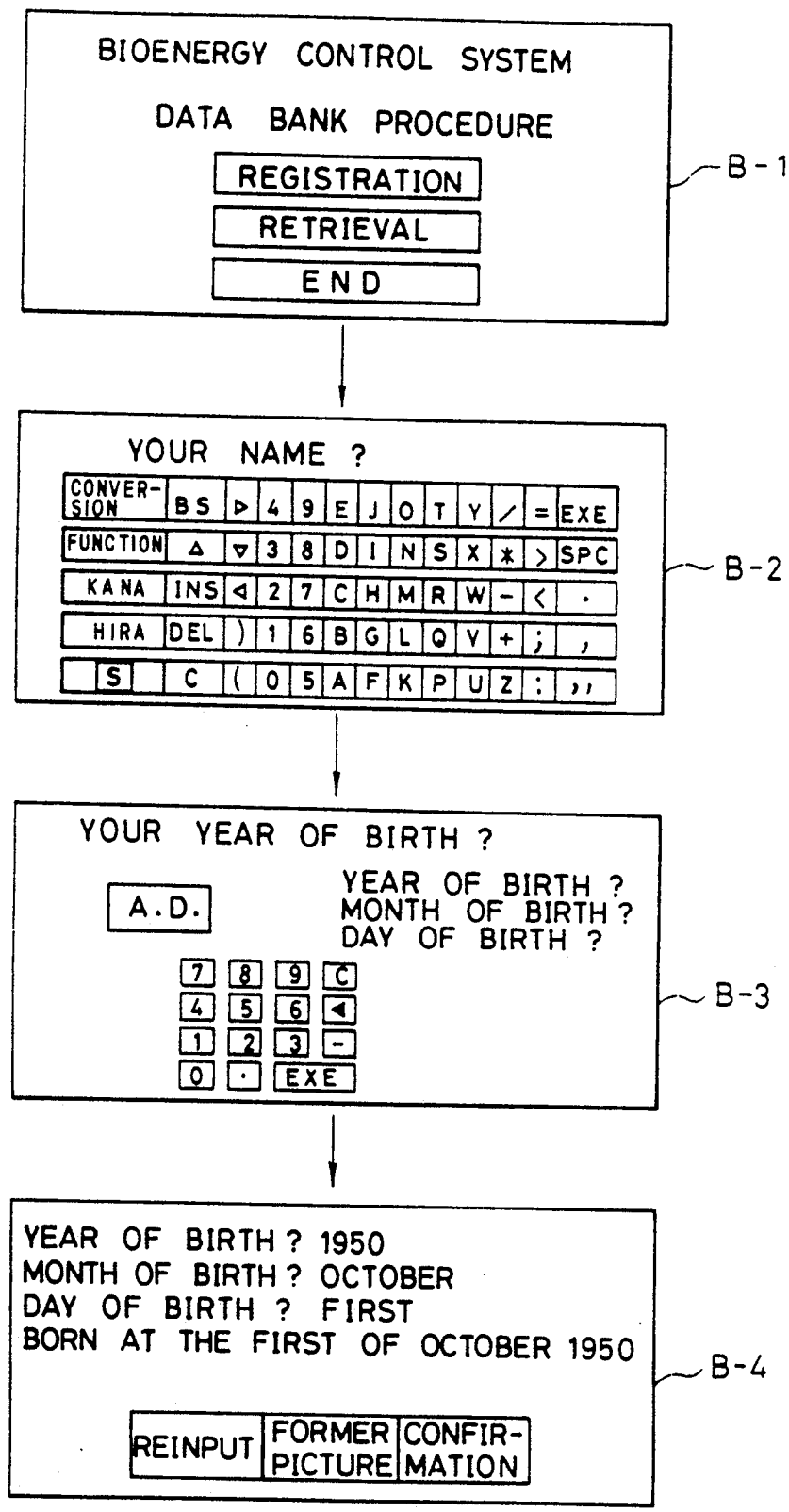

In FIG. 11, the CPU 101 displays character keys as shown at B-2 in FIG. 18A and waits for an input of name of a registrant.

After the input of the name, displays for inputting date-of-birth information and information about a blood type and favorite color are made as shown at B3-B7 in FIG. 18A while the CPU 101 stores the information inputted by the operator into an internal register (Step S310-1).

When the arithmetic operation on bioenergy numbers in Step S200 (see FIG. 7) is being executed, the bioenergy numbers and the date-of-birth information are stored in the RAM 102, so that these stored information can be used as input information in the control procedure.

Figure 18B:
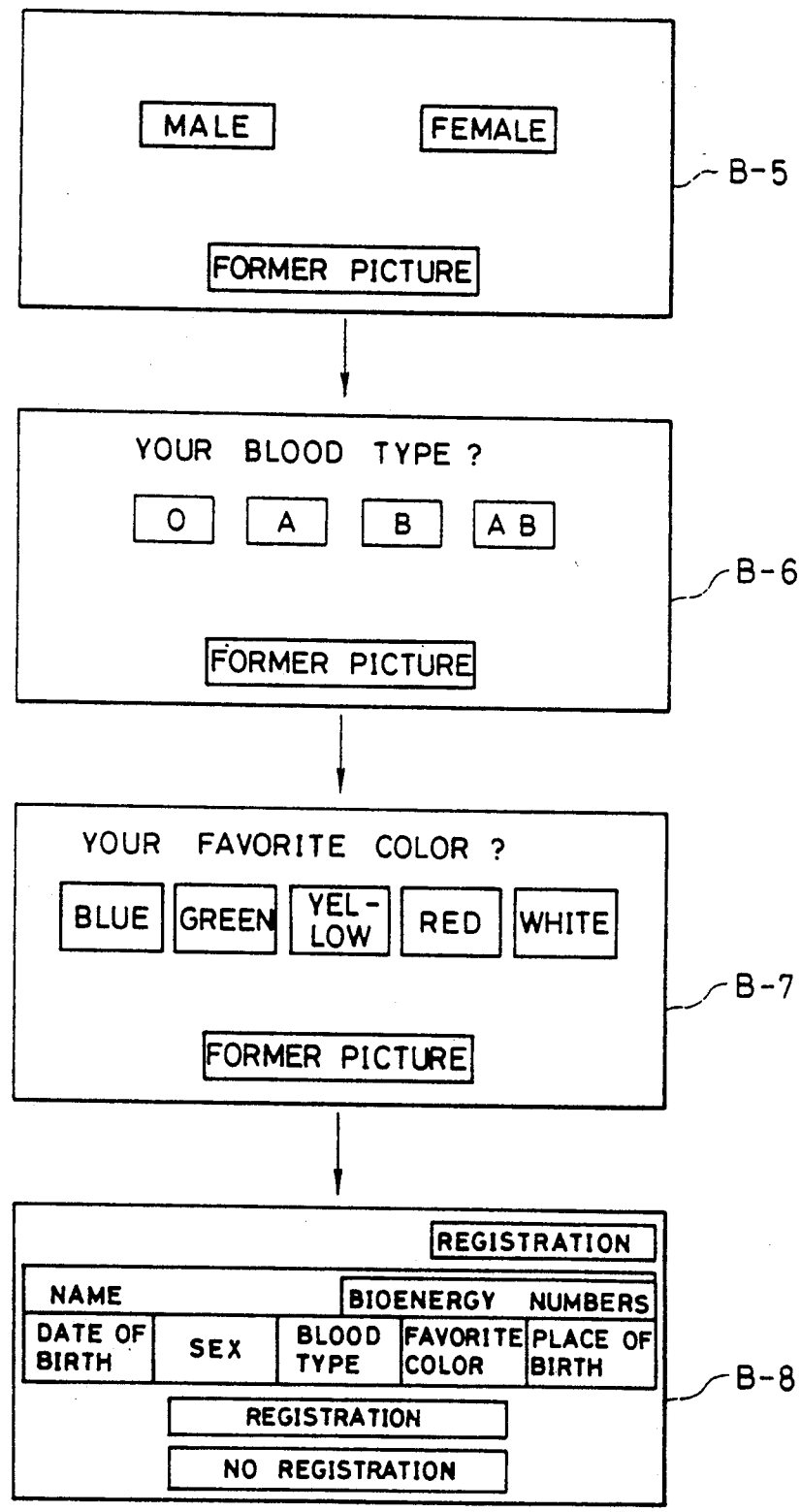

Next, the CPU 101 calculates bioenergy numbers as indicated by the display B-8 in FIG. 18B and displays on the LCD 106 the inputted information in the abovementioned order and waits for a registration command to be given by the operator (Steps S310-2–S310-3). In response to the registration instruction from the operator, the CPU 101 transferres the bioenergy numbers, the inputted information to be registered and a control command for making the registration to the host computer 130 through the interface 109 (Steps S310-4–S310-5).

In the second embodiment of the present invention, after the input of the information and then the confirmation of the registration thereof, the information is transferred to the host computer 130, but it is to be understood that when it is desired to reduce the number of the key input operations, the confirmation of the registration can be eliminated and after the confirmation of the completion of the input of all information, the input information can be transferred to the host computer 130.

Figure 16:
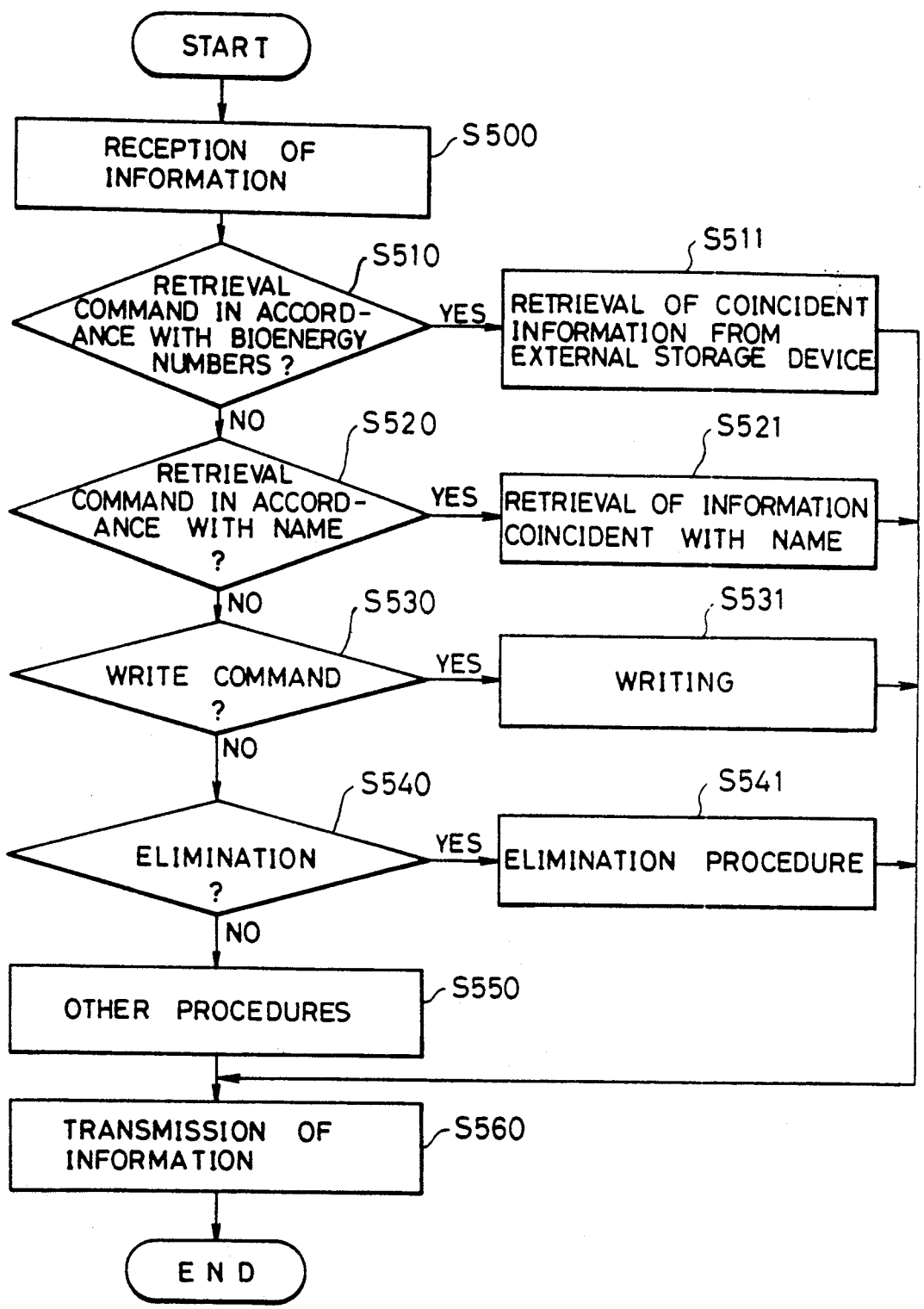

When the host computer 130 receives the above-mentioned information from the CPU 101, the host computer 130 executes a control procedure as shown in FIG. 16 so that the information to be registered including the bioenergy numbers are stored in the external storage device 131.

Figure 12:
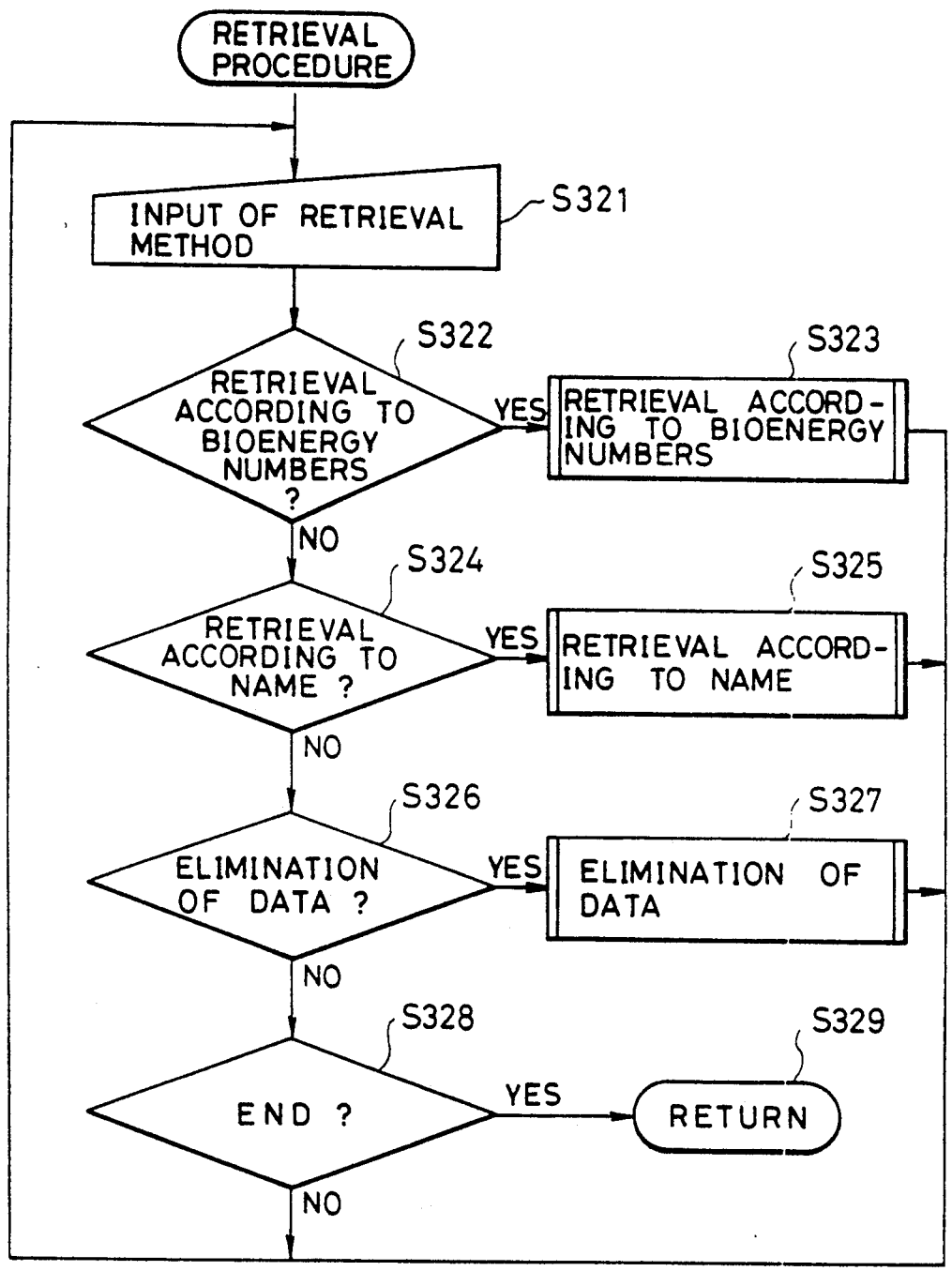

FIG. 12 shows a detailed control procedure for information retrieval carried out in Step S320 in FIG. 10.

Figure 19:
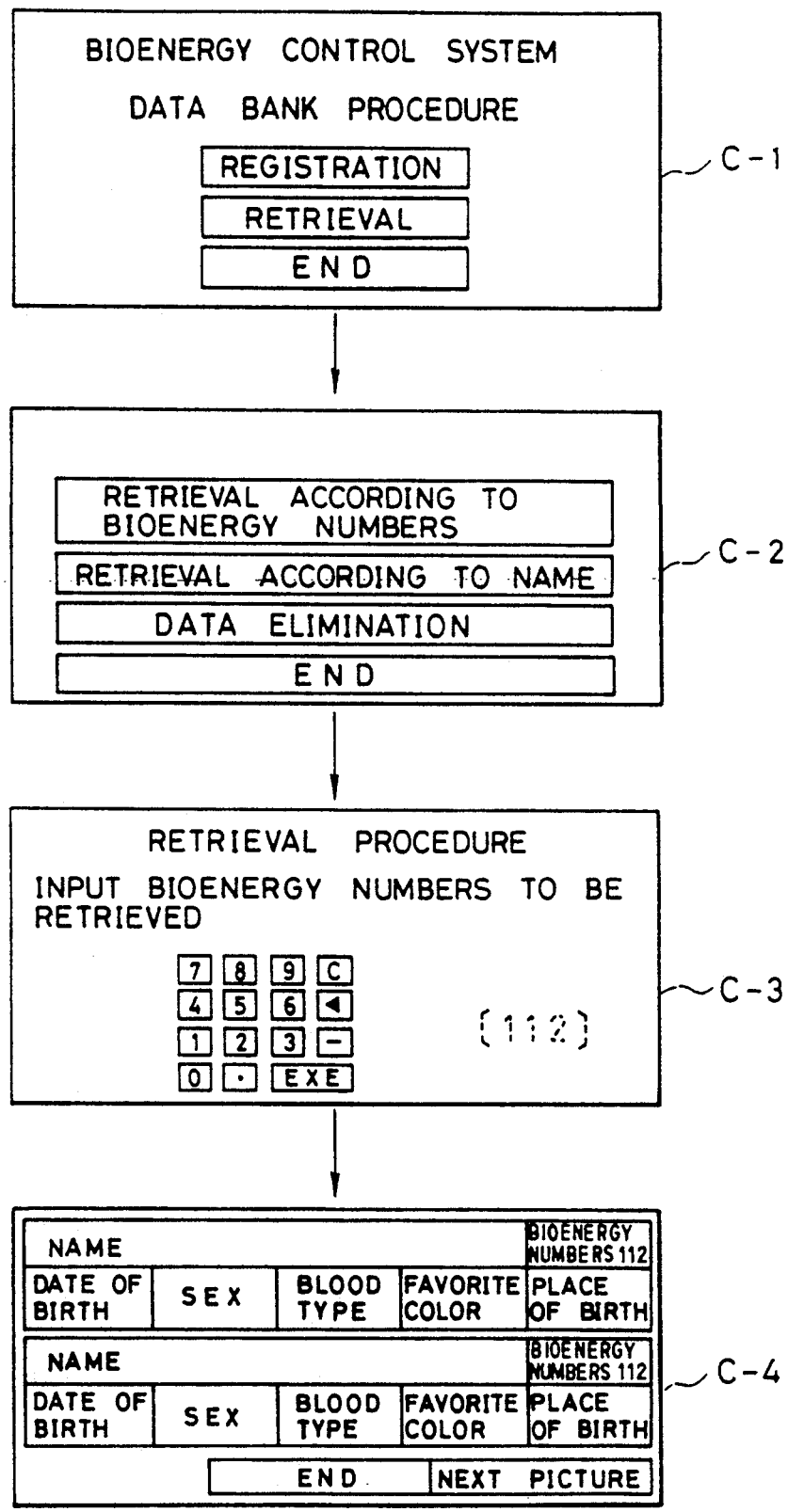

In FIG. 12, the CPU 101 shows a display C2 as shown in FIG. 19 and waits for a selection by the operator in the processes of information retrieval according to given bioenergy numbers, information retrieval according to a given name, the elimination, that is, a process for eliminating the information stored in the external storage device 131 or end process (Step S321).

When the operator selects the information retrieval process according to given bioenergy numbers, the procedure proceeds through Step S321→Step S322→Step S323 in this sequence.

When the operator selects the elimination process, the procedure proceeds through Step S321→Step S322→Step S324→Step S326→Step S327 in this sequence. When the operator selects the end process, the procedure proceeds through Step S321→Step S322→Step S324→Step S326→Step S327→Step S328→Step S329 and then terminates.

Figure 13:
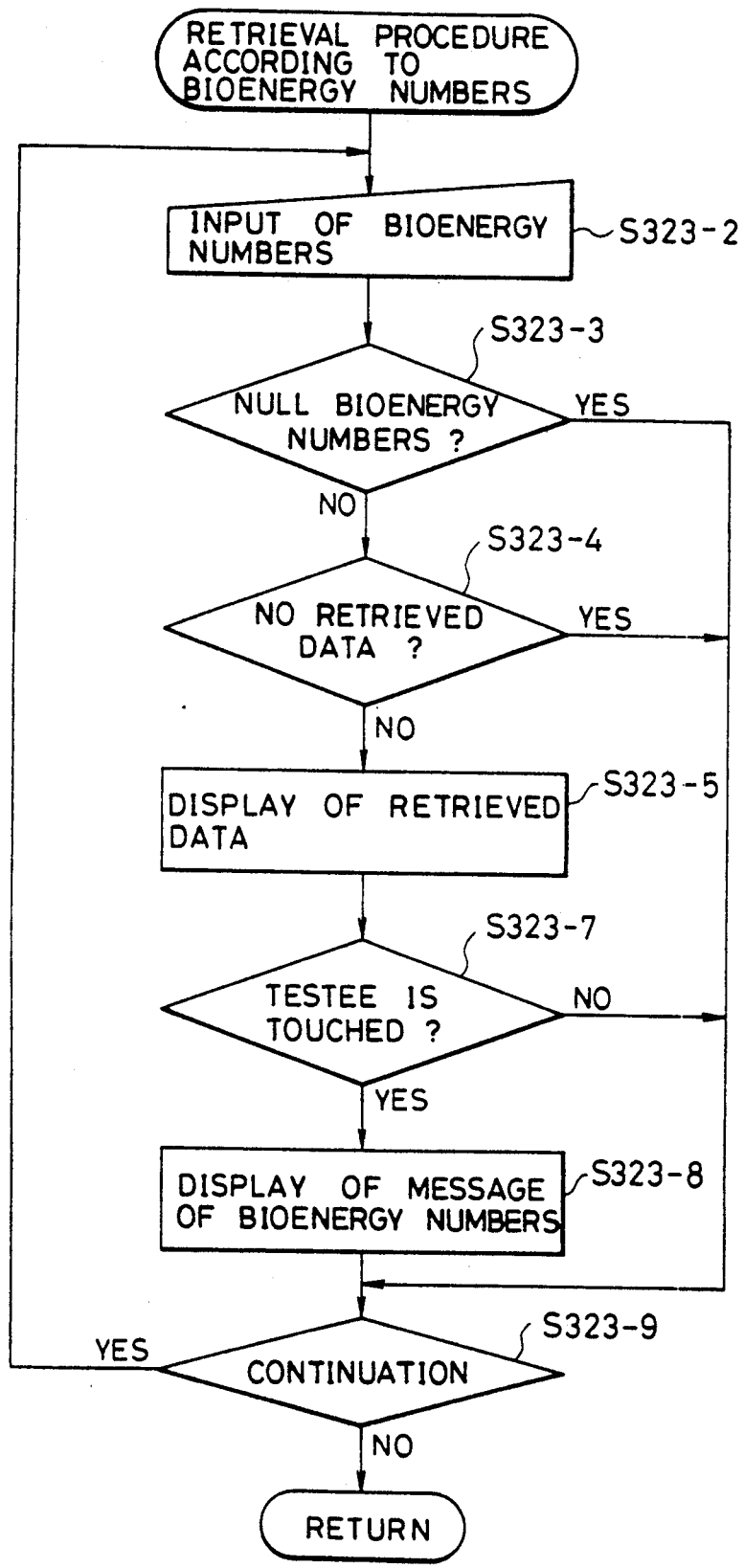

FIG. 13 shows a detailed procedure for the information retrieval according to given bioenergy numbers carried out in Step S323 shown in FIG. 12.

In FIG. 13, CPU 101 shows a display C-3 as shown in FIG. 19 on the LCD 106 and then waits for an input of bioenergy numbers to be retrieved thereby.

Next, when the operator inputs bioenergy numbers of, for instance, "112", the CPU 101 commands the host computer 130 to retrieve the registered data with the bioenergy numbers "112" from the external storage device 131. The host computer 130 executes the control procedure as shown in FIG. 16 and returns the retrieved information to the CPU 101 (Step S232-2).

When there is no registered information corresponding to the inputted bioenergy numbers, the host computer 130 informs a message of this fact to the CPU 101. CPU 101 displays on the LCD 106 the registered information retrieved by the host computer 103; that is, more than one piece of information including the bioenergy numbers "112" as shown at C-4 in FIG. 19 (Step S323-5).

When the operator indicates the "END" in the display C-4, the control procedure proceeds through Step S323-5→Step S323-7→Step S323-9 in this sequence and then terminates. When a conversion to the next display screen is instructed, the control procedure returns to Step S323-2. In response to this proceding of the step, the display C-4 on the LCD 106 returns to the display C-3 so that the retrieval of the registered information can be repeated by executing the above-mentioned procedure repreatedly.

When the operator depresses the position at which is displayed the name of a testee, the CPU 101 reads out from the memory card 107 other information about the inputted name such as the personality information corresponding to a given bioenergy number and displays the personality information on LCD 106 (Step S323-5→Step S323-7→Step S323-8).

Figure 14:
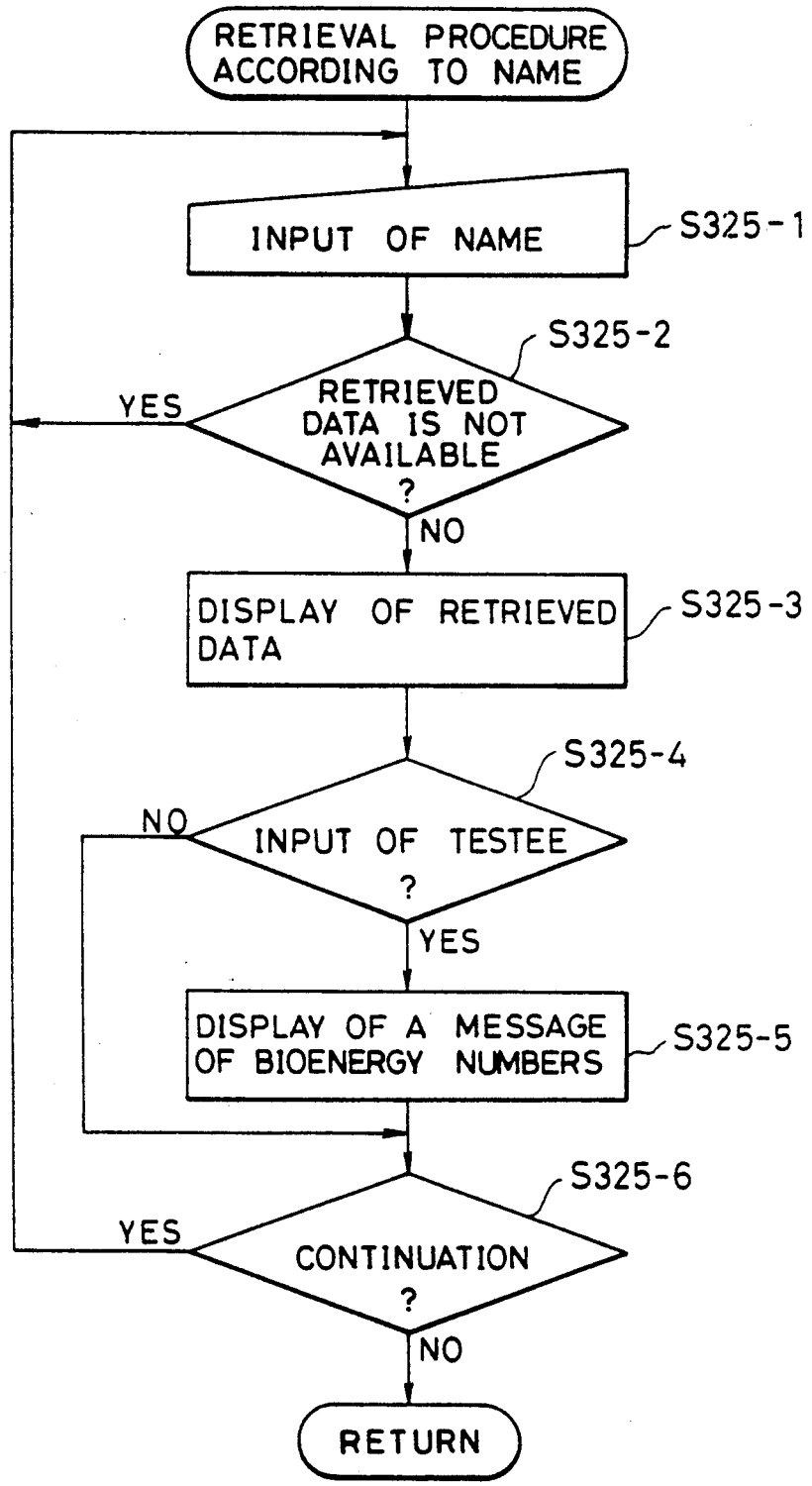

FIG. 14 shows a detailed control procedure for retrieving of a piece of registered information in accordance with a given name, in Step S325 shown in FIG. 12.

Figure 20:
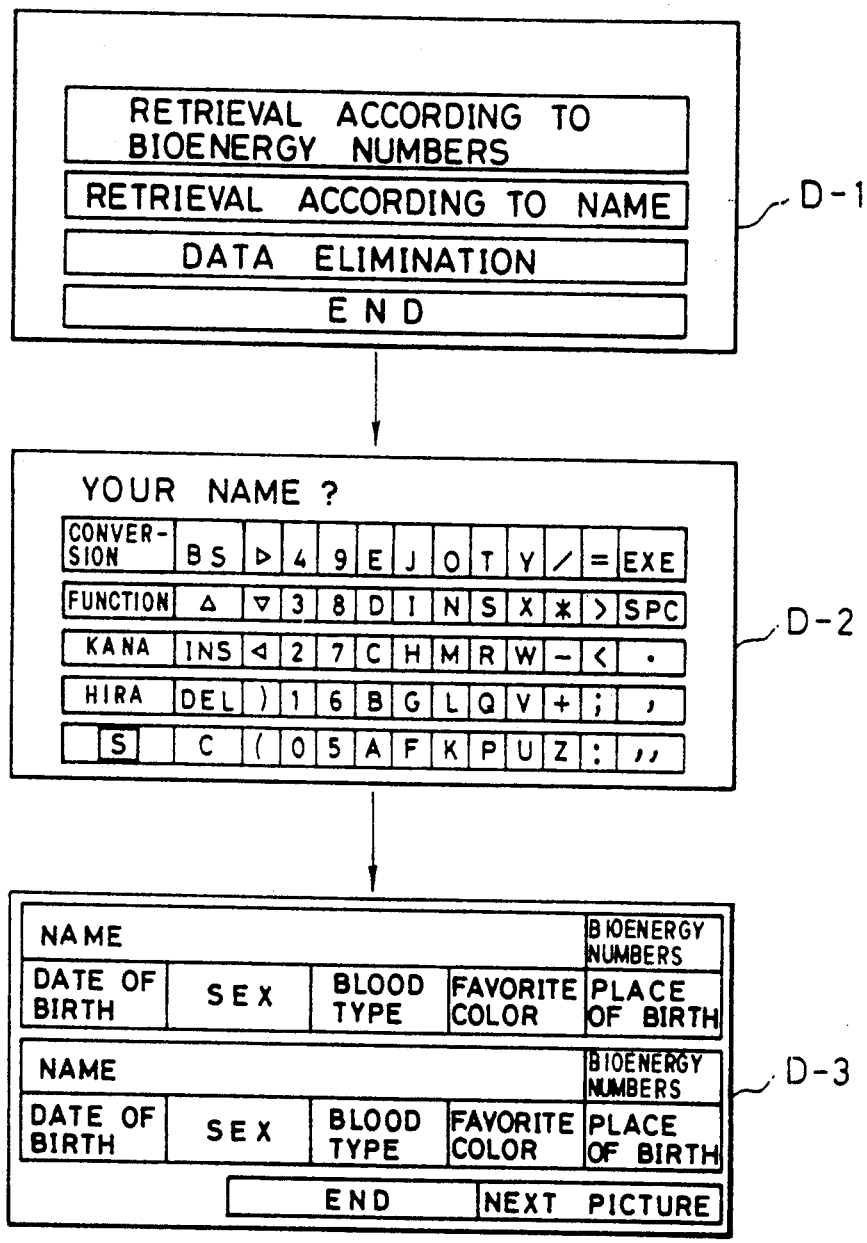

Referring now to FIG. 14, the CPU 101 displays a display D-2 as shown in FIG. 20 on the LCD 106 and waits for an input of a name to be retrieved. In response to the input of a name by the operator, the CPU 101 transmits the command for retrieving the registered information according to the inputted name to the host computer 130. The host computer 130 executes a control procedure as shown in FIG. 16 to retrieve the corresponding registered information and transmits the retrieved registered information to the CPU 101 (Step S325-1).

The CPU 101 displays more than one piece of retrieved registered information on the LCD 106 as shown at D-3 in FIG. 20 (Step S325-3). Furthermore, when the position at which is displayed the name of a testee is depressed, the CPU 101 reads out from the memory card 107 the information about the bioenergy numbers of the testee such as the personality information and displays it in the LCD 106 (Step S325-4→Step S325-5).

Thereafter when "END" is selected by the operator from the display D-3, the CPU 101 interminates the control procedure in Step S325-6 and when the operator instructs the shift to the next picture, the control procedure returns to Step S325-1 so that the above-described procedure is repeated.

Figure 15:
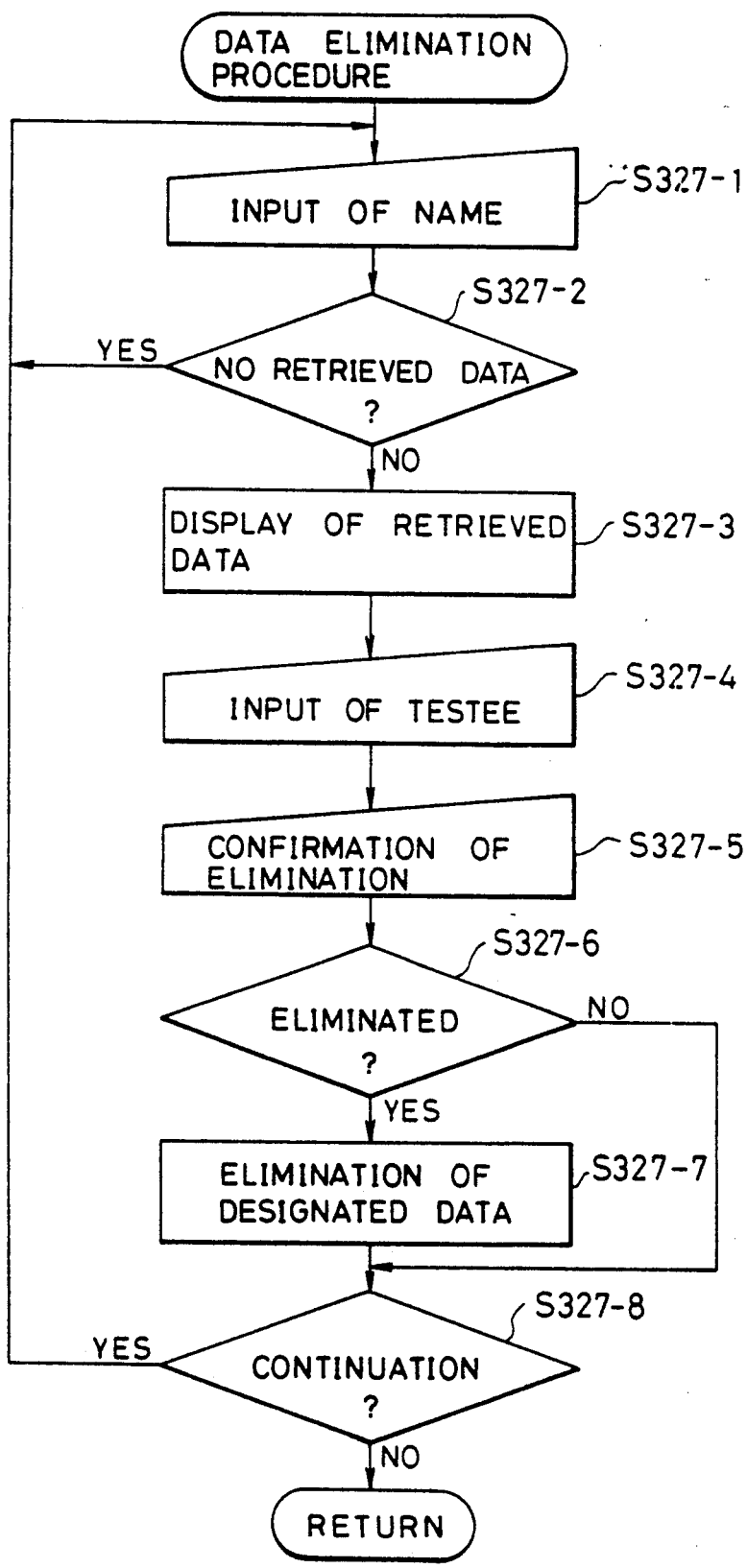

FIG. 15 shows a detailed control procedure for eliminating the registered information in Step S327 shown in FIG. 12.

Figure 21:
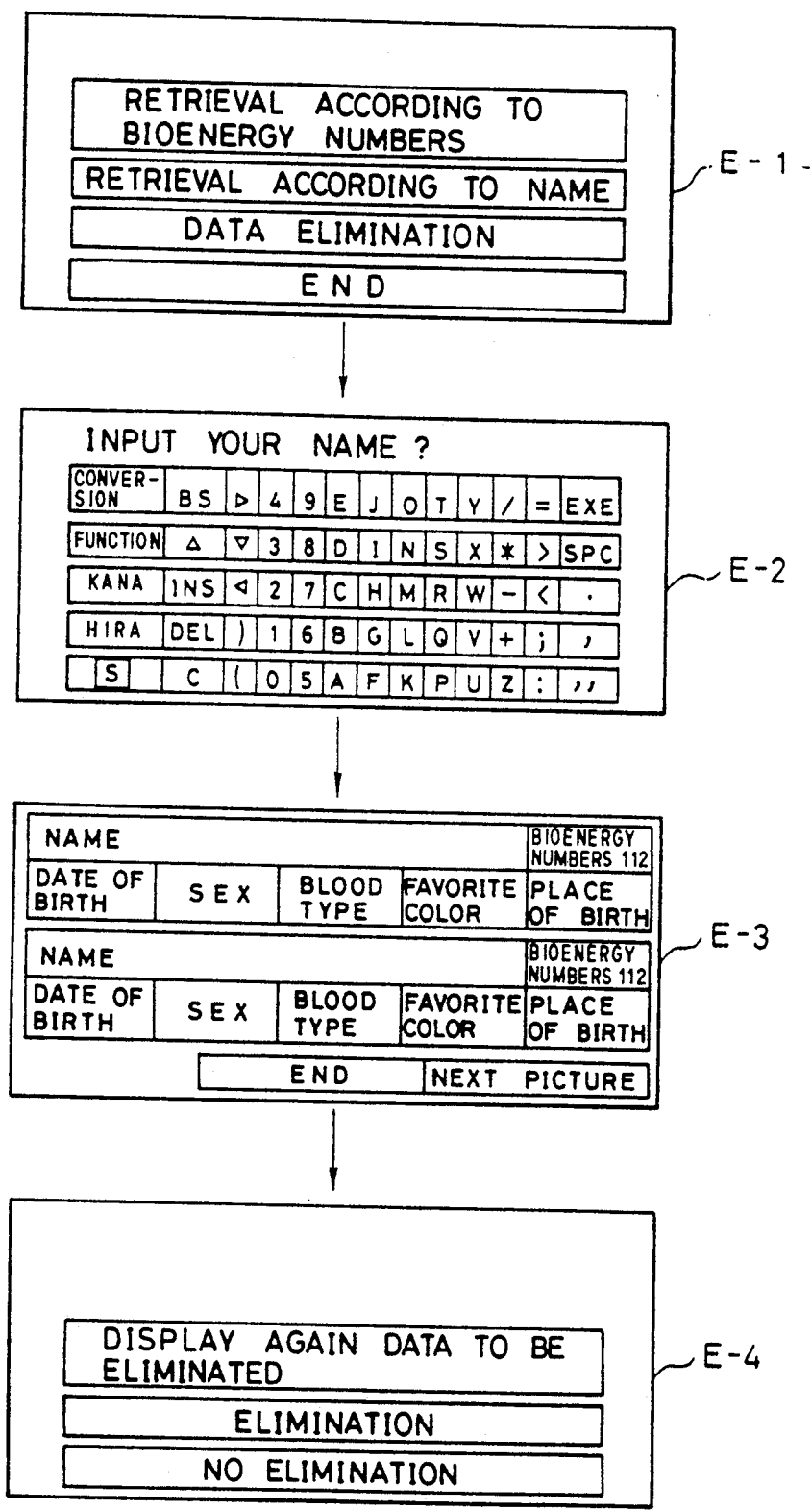

Referring now to FIG. 15, the CPU 101 displays on the LCD 106 a display E-2 as shown in FIG. 21 and waits for an input of the name of a particular person corresponding to the registered data to be eliminated (Step S327-1).

In response to the input of a name by the operator, the CPU 101 reads the registered information corresponding to the name inputted from the external storage device 131 through the host computer 130 and displays it on the LCD 106 (Step S327-3) as shown at E-3 in FIG. 21.

When the operator despresses a position in the display E-3 at which is displayed the name of a testee to be eliminated, the CPU 101 displays on the LCD 106 again the display E-4 as shown in FIG. 21 of the registered information of the testee indicated, and thereby confirms the elimination (Step S327-5). In response to the instruction of the elimination given by the operator, the CPU 101 commands the elimination of the registered information now displayed on the LCD 106 to the host computer 130.

In response to this elimination command, the host computer 130 eliminates the information which is stored in the external storage device 131 and is instructed to be eliminated by, for instance, replacing it by null information (Step S327-7).

Next, in response to the "END" instruction from the operator, the control procedure terminates.

FIG. 16 shows a control procedure executed by the host computer 130 shown in FIG. 1. The control procedure accomplishes the functions of writing means and detection means.

Referring now to FIG. 16, in response to the reception of the control command from the CPU 101, the host computer 130 compares a code of the received control command with a plurality of previously stored control command codes to detect the control command code which coincides with the received control command code, thereby identifying the received control command (Steps S510-S540).

Thereafter, the host computer 130 executes the process corresponding to the identified control command. The procedures for writing, information retrieval and elimination are well known in the art so that no detailed explanation shall not be made in this specification.

According to the second embodiment of the present invention, the bioenergy computer 100, the host computer 130 and the external storage device 131 are arranged independently of each other, but it is to be understood that the system in accordance with the present invention can be made into an integral system by utilizing a small-sized computer called a word processor.

Furthermore, in the system in accordance with the present invention, the exchange of information between the bioenergy computer 100 and the host computer 130 can be made through a public-telephone network.

INDUSTRIAL APPLICABILITY

According to the first aspect of the present invention, the calculation of bioenergy numbers which requires prodigious labor can be executed within a short period of time in a simple manner and furthermore the effect of obtaining the personality information corresponding to bioenergy numbers can be attained.

According to the second aspect of the present invention, not only the calculation of bioenergy numbers can be executed but also the calculated bioenergy numbers plus additional information can be stored in the second memory means so that the desired information can be retrieved by retrieval means from the bioenergy numbers and their associated information stored in the second memory means and can be effectively utilized.

In the system being capable of effective utilization of the bioenergy numbers, for instance, the personality assessment and vocational aptitude obtained from bioenergy numbers with the bioenergy numbers are stored as the personal information of each of the employees in a corporation or the like in the second memory means so that a retrieval of the stored information according to the name of each employee and the assignment of each employee to a job most adapted for his/her vocational aptitude may be considered in the personal management system. Furthermore, the present invention can be applied to a system for introducing a prospective bride or groom so that a most preferable bride or groom who is compatible in temperament with a groom or bride seeker can be retrieved. In addition, the present invention can be applied to a market research so that a prospective customers for a particular good can be retrieved. Moreover, a system of the present invention can be applied to an education or training system so that a lesson such as mathematics, physics, music, painting or the like which is suitable to the aptitude of a learner to trainee can be indicated.

What is claimed is:

1. A bioenergy control system comprising:
   means for calculating a bioenergy number representing inherent bioenergy based on inputted information about date of birth;
   first memory means for storing, in advance, values which can be assigned to said bioenergy numbers and information relating to individual character and capacity and associated with said values;
   means for retrieving from said first memory means said information associated with said values and corresponding to said bioenergy numbers calculated by said calculation means;
   first output means for outputting the retrieved information;
   second memory means for storing registered information;
   registration instruction means to produce additional input information;
   writing means for writing said registered information into said second memory means using said additional input information to configure said registered information;
   retrieval instruction means for instructing a retrieval of said configured registered information;
   retrieving means for reading out from said second memory means said configured registered information in response to the instruction from said retrieval instruction means, said retrieving means reconfiguring the configured registered information in accordance with the instructions from the retrieval instruction means into a display that indicates the registered information corresponding to the bioenergy number; and
   second output means for outputting the readout registered information.

2. A bioenergy control system as claimed in claim 1, wherein said first and second output means comprise a display device.

3. A bioenergy control system as claimed in claim 1, wherein said first and second output means includes means for outputting said information as vocal sounds.

4. A bioenergy control system as claimed in claim 1, wherein said second memory means comprises a detachable memory card.

5. A bioenergy control system comprising:
   means for calculating a bioenergy number representing inherent bioenergy based on inputted information about date of birth;
   first memory means for storing, in advance, values which can be assigned to said bioenergy numbers and information relating to individual character and capacity and associated with said values;
   means for retrieving from said first memory means said information associated with said values and corresponding to said bioenergy numbers calculated by said calculation means;
   first output means for outputting the retrieved information;
   second memory means for storing registered information;
   registration instruction means to produce additional input information and further wherein said bioenergy numbers are three integers of X, Y, Z which are obtained in accordance with the year A.D. of birth YEAR, the month of birth MONTH and the day of birth DAY and $X$ = the remainder of YEAR/6 (when the remainder is "0", it is assumed to be "6"),  (1)

$Y$ = the remainder of D/6 (when the remainder is "0", it is assumed to be "6")  (2)

$Z$ = the remainder of $(X+Y)/6$ (when the remainder is "0", it assumed to be "6"  (3)

when variables A, B and C are the integers obtained by the following formula:

$$D = A + C \quad (4)$$

$C$ = the remainder of B/6 (when the remainder is "0", it is assumed to be "6")  (5)

when the month of birth MONTH is April (4), June (6), August (8), October (10) or December (12).

$$A = MONTH/2 \quad (6)$$

and $$B = DAY + 30 \quad (7);$$

when the month or birth MONTH is February (2), $$A = MONTH/2 \quad (8)$$

and $$B = DAY + 31 \quad (9);$$

when the month of birth or MONTH is January (1), September (9) or November (11), $A$ = an integer raised fraction to MONTH/2  (10)

and $$B = DAY \quad (11);$$

when the month of birth is March (3), May (5), or July (7), $A$ = an integer raised fraction to MONTH/2  (12)

and $B = DAY - 1$ (where B is "0", it is assmed to be "61" and the value obtained by subtracting "1" from A obtained by Equation (12) is now defined as A and when the new value of A is "1" and the year of birth YEAR is not a leap year, B is assumed to be "60");

writing means for writing said registered information into said second memory means using said additional input information to configure said registered information;

retrieval instruction means for instructing a retrieval of said configured registered information;

retrieving means for reading out from said second memory means said configured registered information in response to the instruction from said retrieval instruction means, said retrieving means reconfiguring the configured registered information in accordance with the instructions from the retrieval instruction means into a display that indicates the registered information corresponding to the bioenergy number; and second output means for outputting the readout registered information.

* * * * *